United States Patent [19]

Moon et al.

[11] Patent Number: 4,516,177
[45] Date of Patent: May 7, 1985

[54] ROTATING RIGID DISK DATA STORAGE DEVICE

[75] Inventors: William G. Moon, Sunnyvale; Ronald R. Moon, Santa Clara; Bruce R. Peterson, San Jose; Donald C. Westwood, Cupertino, all of Calif.

[73] Assignee: Quantum Corporation, Milpitas, Calif.

[21] Appl. No.: 475,599

[22] Filed: Mar. 15, 1983

Related U.S. Application Data

[63] Continuation-in-part of Ser. No. 424,914, Sep. 27, 1982, abandoned.

[51] Int. Cl.³ .......................... G11B 5/55; G11B 5/58
[52] U.S. Cl. ........................................ 360/77; 360/78
[58] Field of Search ................................... 360/77, 78

[56] References Cited

U.S. PATENT DOCUMENTS

| | | |
|---|---|---|
| 3,034,111 | 5/1962 | Hoagland et al. |
| 3,597,750 | 8/1971 | Brunner et al. ........................ 360/77 |
| 3,812,533 | 5/1974 | Kimura et al. ..................... 340/172.5 |
| 4,084,201 | 4/1978 | Hack ..................................... 360/135 |
| 4,135,217 | 1/1979 | Jacques et al. ........................ 360/77 |
| 4,237,502 | 12/1980 | Erickson, Jr. et al. ............... 360/78 |
| 4,314,291 | 2/1982 | Oda et al. .............................. 360/78 |
| 4,333,117 | 1/1982 | Johnson ................................. 360/78 |
| 4,396,959 | 8/1983 | Harrison et al. ....................... 360/77 |
| 4,419,701 | 12/1983 | Harrison et al. ....................... 360/77 |

OTHER PUBLICATIONS

IBM Technical Disclosure Bulletin, vol. 23, No. 3, Aug. 1980, pp. 1203–1210, "Improvement in the Position Error Signal Detector Channel for a 'Buried Servo' Recording System", C. Handen, R. W. Lissner, C. C. Liu & V. R. Witt.

Primary Examiner—George G. Stellar
Attorney, Agent, or Firm—David B. Harrison

[57] ABSTRACT

An improved rotating disk data storage device is achieved in a combination of an optical encoder to detect data track crossings, a servo sector surface on one of a plurality of rotating data storage disks with the surface being filled with a pattern of alternating bursts which are read for relative amplitude and compared to provide track centerline information. A programmed microprocessor and a rotary actuator for the data transducers combine with the other elements to move the transducers from track to track and keep them on track during data read and write operations.

29 Claims, 8 Drawing Figures

DISK DRIVE 10

ROTATING RIGID DISK DATA STORAGE DEVICE

BACKGROUND OF THE INVENTION

The present application is a continuation-in-part of U.S. patent application Ser. No. 06/424,914, filed Sept. 27, 1982, now abandoned.

This invention relates to rotating rigid disk data storage devices of the flying head or Winchester type. More particularly, the present invention relates to vastly improved non-removable media, high storage capacity rotating rigid disk data storage apparatus and methods.

The inventors' assignee has pioneered the development of low cost, high performance rotating rigid disk data storage devices in the non-removable eight inch media field. Such devices are the subject of two co-pending U.S. patent applications: Ser. No. 190,198 filed Sept. 24, 1980 entitled DATA TRANSDUCER POSITION CONTROL SYSTEM FOR ROTATING DISK DATA STORAGE EQUIPMENT, now U.S. Pat. No. 4,396,959; and Ser. No. 304,209 filed Sept. 21, 1981, entitled DATA TRANSDUCER POSITION CONTROL SYSTEM FOR ROTATING DISK DATA STORAGE EQUIPMENT, now U.S. Pat. No. 4,419,701. Both of these patent applications related to the common assignee's Q2000 Series ™ of eight inch, non-removeable media disk drives providing up to 40 megabytes of on-line data storage (unformatted) with four storage disks.

The Q2000 disk drive products have been very successful in the marketplace. Those drives have achieved a maximum storage capacity of approximately forty megabytes with average track access times of approximately 75 milliseconds. This achievement came about through the use of an optical servo loop in conjunction with a single servo sector on a disk surface. A programmed digital microprocessor received track crossing information from the optical servo and track centerline error information from the servo sector, and it calculated track destination and track centerline correction values and commanded a rotary actuator to move the data transducer assembly to the desired track and to keep it on-track during data read/write operations.

Despite the fact that the original Q2000 data storage products achieved a very high data storage capacity and a reasonable average track access time, a need has arisen for a higher capacity, higher performance disk drive which effectively doubles the data storage capacity and effectively halves the average track access time.

High track densities are known in the prior art. For example, it is presently possible to achieve a track density of approximately 960 tracks per radial inch of the disk data storage surface. Heretofore, the drawback of such densities has been the narrowness of the data storage track and the resultant susceptibility to track following errors of the data transducers from mechanical resonances, vibrations, aperiodic mechanical movements, thermal expansion, etc. Successful drives achieving a track density of 960 tracks per inch have had to be designed with great care paid to mechanical rigidity and very high natural resonant frequencies. Very complex closed loop servo systems were required to keep the transducers positioned within the selected data tracks so that there would be no loss of data during read/write operations. These stringent requirements for mechanical rigidity in the data transducer mover means and in the servo loop controlling such means led to very high costs of manufacture, without very much variation being tolerated in the manufacturing process.

SUMMARY OF THE INVENTION WITH OBJECTS

A general object of the present invention is to adapt low cost, high performance technology in known non-removeable media rotating rigid disk data storage devices to provide a very high data density data storage device having significantly improved performance achieved at high reliability and low prime manufacturing cost.

Another object of the present invention is to combine an optical encoder together with a dedicated servo surface to provide a microprocessor with optical track location and on-disk track centerline correction information and then use the microprocessor to calculate digital values and apply them to control a rotary actuator to seek a desired track, to settle at that track and to maintain the data transducer in centerline alignment with the desired track in a data storage device having a track width as narrow as 0.7 mil, a guard band of as small as 0.6 mil and a high track density of about 789 tracks per inch.

Yet another object of the present invention is to provide a closed loop servo system for a rigid rotating disk data storage device which is of higher performance and which is simplified over prior approaches.

One more object of the present invention is to provide a rigid rotating disk data storage device which includes a novel reinforced base casting which achieves significantly improved mechanical rigidity and thermal dissipation characteristics while also achieving compactness.

Still one other object of the present invention is to provide a rigid rotating disk data storage device with an improved control method and rotor assembly for rotatably moving the data transducer assembly from a departure data track to a desired destination track at twice the average velocity of prior methods, to settle the assembly at the destination track more rapidly than heretofore, and to keep the assembly positively aligned at the desired track during data read/write operations.

Still one other object of the present invention is to provide a data transducer support arm assembly with reduced length and mass and with characteristics facilitating improved manufacturability.

These and other apparent objects and advantages are achieved by apparatus improving a data storage device which includes a base, a plurality of rotating rigid magnetic data storage disks commonly journalled for rotation to the base, a plurality of read/write data transducers held in close proximity to the major surfaces of said disks by air-bearing effect, and a current operated rotary actuator carriage mechanism journalled to the base with an axis of rotation parallel to that of the disks, the actuator for positioning the transducers at one of a multiplicity of concentric data tracks during data read/write operations and for moving the transducers from track to track during track seeking operations.

The improvements to this device include the following cooperating and interacting structural elements:

An optical encoder has a scale mounted to the actuator and has a light source/optical sensor array assembly secured to the base. The scale is provided with a series of equally spaced apart radial microlines aligned to pass between the light source and the array to provide a plurality of phase related signals indicating transducer position relative to the base.

One dedicated surface of one of the disks is divided into a plurality of radial sectors, each sector prerecorded with a plurality of first bursts offset from track centerline in a first radial direction for odd numbered tracks and offset from track centerline in a second opposite radial direction for even numbered tracks. The first burst are adjacently interleaved between the second bursts as to create a checkerboard-like pattern of bursts of the two types. The servo bursts are not necessarily phase coherent, as burst phase is not used by the device.

A peak detector is connected to the transducer reading the servo surface, and it detects and puts out average peak amplitude values for each sector servo burst read by the transducer.

An analog switch is connected to the optical encoder and to the peak detector. The analog switch puts out the phase related position signals and the peak amplitude values, one at a time.

An analog to digital converter is connected to the analog switch and it converts each analog signal received therefrom into a digital word.

A user interface circuit is provided for connecting the device to user equipment so that data may be received and sent and so that the user equipment may command disk surface and track selection via control data.

A tachometer is coupled mechanically to the disks for generating clock signals representing sector boundaries.

A programmed digital microprocessor is connected to the user interface, tachometer, the analog to digital converter, the analog switch and the peak detector. The processor calculates from digital information received from these sources digital control data words for commanding the rotary actuator to move from a departure track to a user-defined destination track and settle at the destination track during track seeking mode and for commanding the actuator to maintain the transducers in track centerline alignment during track following mode. The tachometer controls the microprocessor which in turn controls the detector, analog switch and the analog to digital converter.

A digital to analog converter is connected to the microprocessor to receive and convert the digital control data words into analog signal values.

A rotary actuator driver amplifier is connected to the digital to analog converter. It receives digital control values therefrom and sends current steps through the rotary actuator to effect track seek, settle and follow.

One additional structural aspect of the present invention is an improved base which comprises a unitary casting including reinforcing members for structural rigidity high natural resonance and improved heat dissipation-reinforcement members in the vicinity of the rotary actuator for improved heat dissipation therefrom while maintaining requisite stiffness.

Another structural aspect of the present invention is to provide an improved rotary actuator assembly which achieves significantly higher torque and thereby moves the data transducer assembly from a departure track to a destination track at a significantly higher average velocity.

A further structural aspect of the present invention is to provide a data transducer support arm assembly with reduced length and mass while maintaining requisite stiffness and which is adapted to be manufactured more easily than previously.

The improved data storage method of the present invention includes the steps of:
rotating a plurality of rigid magnetic media data storage disks relative to a base,
reading data from and writing data to major surfaces of the disks with read/write data transducers held in close proximity to said surfaces by air-bearing effect,
positioning the data transducers at selected ones of a multiplicity of concentric data tracks on the surfaces with a current operated transducer mover mounted to the base,
providing a plurality of phase related signals indicating transducer position relative to the base,
providing a servo surface of one of the disks with a plurality of radial sectors, each sector prerecorded with a plurality of first bursts offset from track centerline in a first direction for odd numbered tracks and offset from track centerline position in a second direction for even numbered tracks, and prerecorded with a plurality of second bursts spatially interleaved between the first bursts and offset from track centerline in the second direction for odd numbered tracks and offset from track centerline in the first direction for even numbered tracks,
detecting and putting out average peak amplitude values for each sector servo burst read by a transducer for the servo surface,
switching in a controlled manner between the plurality of phase related signals and the peak amplitude values of the servo bursts,
converting each switched analog signal into a digital word,
receiving digital disk surface and track selection control data from a user interface,
generating clock signals representing sector boundaries with a tachometer coupled mechanically to the disks,
processing the converted digital words and the control data from the user interface to calculate digital control words in order to command digitally the current operated transducer to move from a departure track location to a destination track location during track seek operations and in order to command digitally the transducer mover to adjust the transducers to data track centerline alignment during track following data read/write operations, and
converting the digital commands into analog driving currents for application to the transducer mover.

The method may also include one or more of the following additional steps of:
providing reference track indentification on the servo sector surface;
providing a look-up table with digital velocity profile data and commanding a velocity profile during track seek operations by referring to the look-up table and calculating and putting out digital current values depending upon the magnitude of the seek and the actual measured positions of the transducers during the seek operation as given by the plurality of phase related signals;
periodically measuring the amplitude of a first phase related signal, switching to the other phase related signal when the first reaches a zero axis and then periodically measuring the amplitude of the other signal until it reaches zero axis, switching back to the first signal, and repeating the measurements;

providing the phase related signals in quadrature, providing a look-up table of digital arc tangent values, calculating an arc tangent angle from the look-up table, calculating an angular displacement value from the arc tangent value and putting out the displacement value as a track centerline correction digital current value;

calculating digital track following currents as adjacent integers within a range between stated integer values wherein the midrange value is defined as zero current in accordance with a stated algorithm; and putting out the highest available integer to command the mover to accelerate in one direction and putting out the lowest available integer to command the mover to accelerate in the opposite direction.

Other objects, advantages and features of the invention will be apparent to those skilled in the art from a consideration of the following detailed description of a preferred embodiment, presented in conjunction with the accompanying drawings.

DETAILED DESCRIPTION OF A PREFERRED EMBODIMENT

Overall System 10 Description

Figure 1:
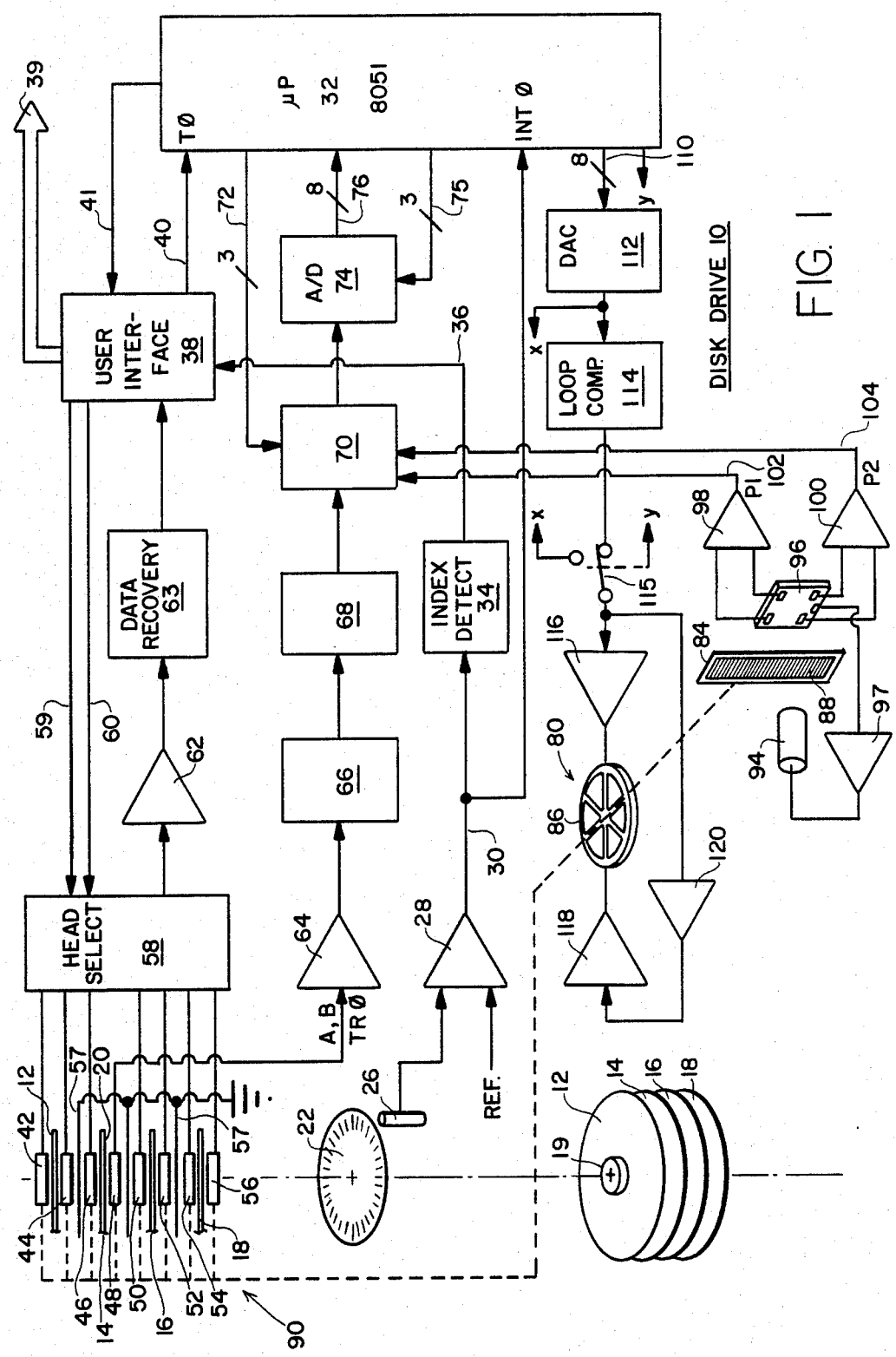
FIG. 1 is an overall system electrical block diagram of the improved disk drive incorporating the principles of the present invention.
Figure 2:
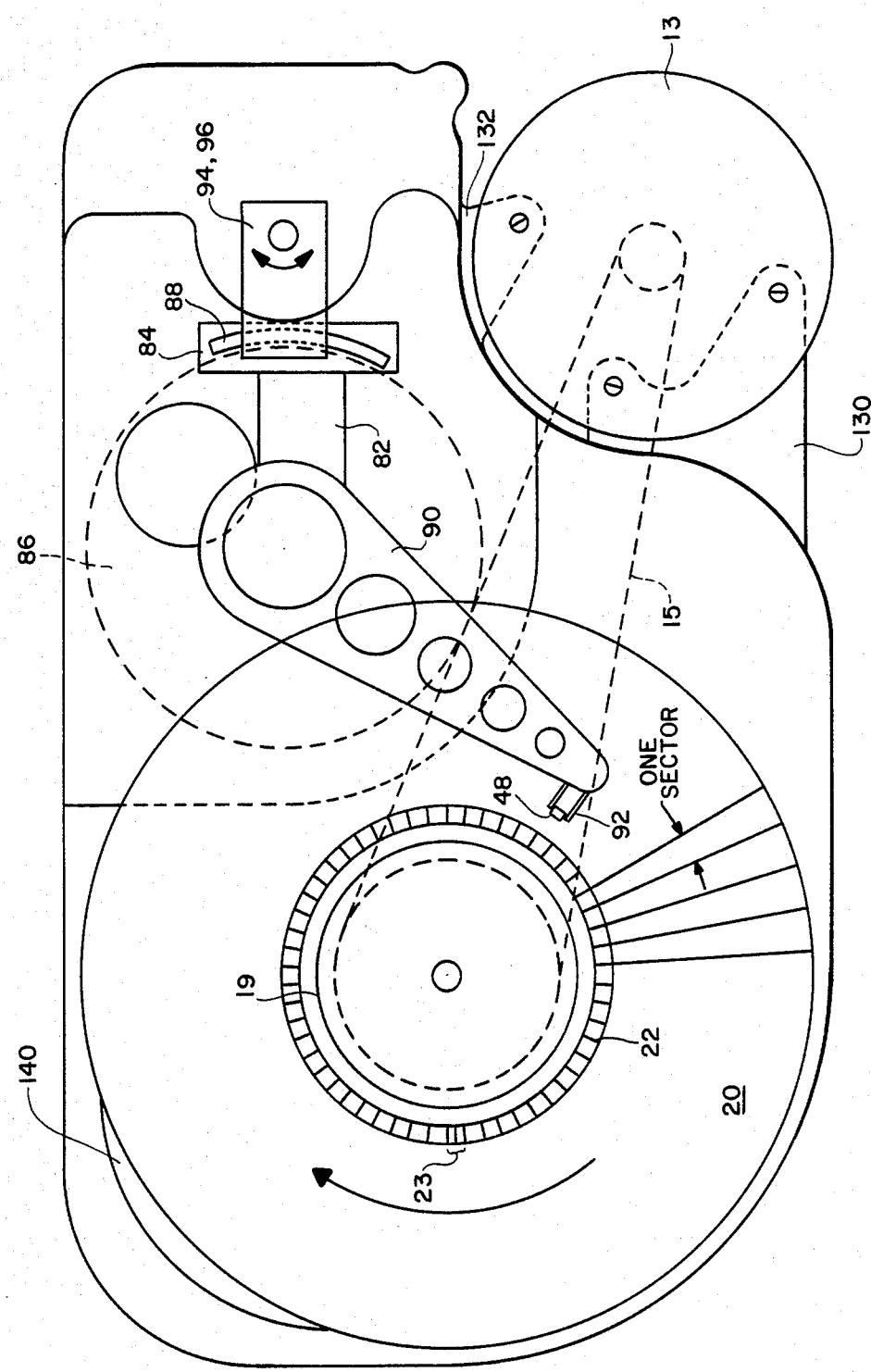
FIG. 2 is a top plan view mechanical schematic diagram of the mechanical elements of the disk drive incorporating the principles of the present invention electrically depicted in FIG. 1.
Figure 3:
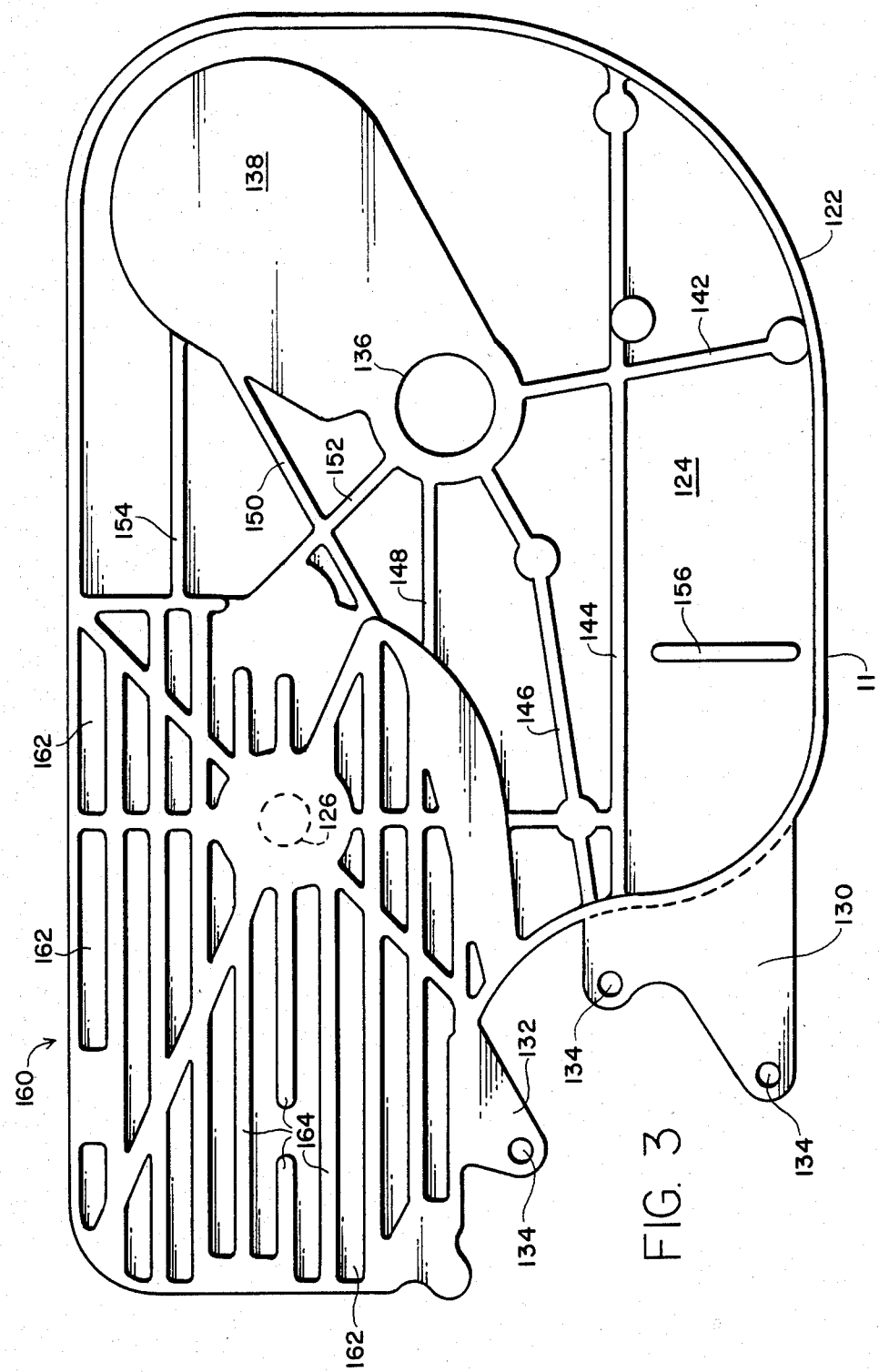
FIG. 3 is a bottom plan view of the base casting of the disk drive depicted in FIGS. 1 and 2.
Figure 4:
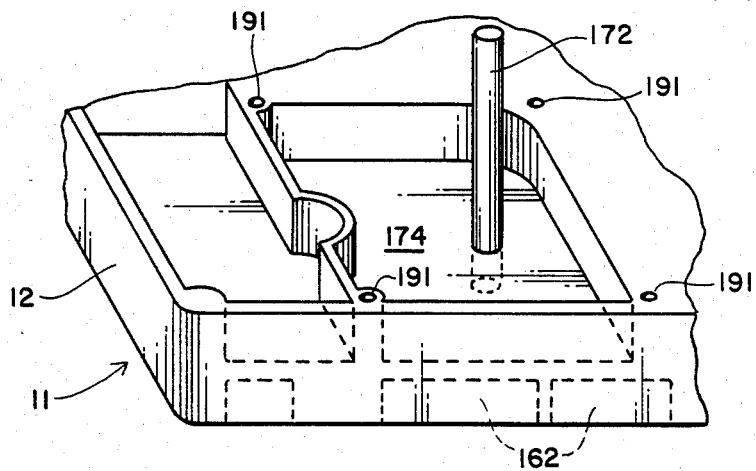
FIG. 4 is an exploded view in detail of the transducer arm rotator assembly of the disk drive depicted in FIGS. 1 and 2.

An improved high capacity disk drive 10 which incorporates the principles of the present invention is best understood by reference to the electrical system block diagram of FIG. 1 in conjunction with the mechanical schematic diagram of the drive 10 provided in FIG. 2. The disk drive 10 is formed upon a cast aluminum base 11. The base 11 includes reinforcing ribs and heat dissipation providing recesses as depicted in FIGS. 3 and 4, and as will be discussed hereinafter. Rotatably journalled to the base casting 11 are four non-removeable disks 12, 14, 16 and 18 having their major surfaces coated with magnetic storage media. These substantially parallel disks 12, 14, 16 and 18 are securely mounted to a rotating hub 19 journalled to the base casting 11. The hub 19 is driven by an electrical motor 13, either directly as with an electronically commutated brushless DC motor, or with an AC motor 13 coupled by a flexible belt 15, as depicted in FIG. 2.

One of the disk surfaces 20, for example the bottom surface of the disk 14 (shown schematically as the top surface in FIG. 2) is dedicated to provide track centerline servo information. The servo surface 20 is equally divided into e.g. 54 radial servo sectors. Each sector is recorded with e.g. two centerline offset "A" servo bursts and two "B" servo bursts interleaved with and radially oppositely offset from the A bursts, as illustrated topographically in FIG. 2 and in great detail in FIG. 8. Each sector also contains track zero TR 0 information, as will be explained hereinafter. Each servo burst is not required to be phase coherent with any of the other bursts. The servo sectors and alternating A, B and Track Zero bursts will be described in more detail hereinafter.

A rotating code disk 22 is also secured to rotate with the hub 19. The code disk 22 defines sector boundaries, and one set of double spokes 23 in the code disk 22 provides an index signal once each complete rotation of the disks occurs.

The perforate code disk 22 works in conjunction with a magnetic transducer 26, such as a Hall Effect transducer. The electrical output signal from the transducer 26 is compared to a reference in a comparator 28. A digital comparison signal (pulse) is put out by the comparator at each detected sector boundary via a sector boundary signal line 30. The line 30 is connected to an interrupt line of a microprocessor 32.

The microprocessor 32 is preferably type 8051, manufactured by Intel Corporation, Santa Clara, Calif., or equivalent. The 8051 microprocessor 32 operates at a clocking speed of 12 MHz. With this microprocessor, the line 30 is connected to the INT 0 pin thereof (pin 12).

The sector boundary signal line 30 is also connected to a once-around index detector circuit 34 which detects the index burst provided by the double spokes 23 in the code disk 22. The output from the once-around detector 34 is provided via a line 36 to a user interface circuit 38 which accomodates the connection of the drive 10 to host computer equipment via a data and control bus 39. The user interface 38 is connected to the microprocessor 32 via a serial data line 40, and a "seek complete" control line 41 extends from the processor 32 to the interface 38.

Since there are eight major data storage surfaces for the disks 12, 14, 16 and 18, there are eight data transducers 42, 44, 46, 48, 50, 52, 54 and 56. The data transducers are of the well known flying head or Winchester type which ride in very close proximity to the disk surface upon an air bearing or cushion effect. Grounded shields 57 are interposed between vertically aligned, adjacent head pairs, 44–46, 48–50, and 52–54 in order to reduce electrical crosstalk.

The head 48 is dedicated to read the prerecorded servo sector data on the lower surface 20 of the disk 14. The other heads 42, 44, 46, 50, 52, 54 and 56 are read/write transducers and are connected for that dual purpose to head select circuitry 58. The select circuitry 58 is controlled by signals from the user interface 58 via a multi-bit control line 59. Data to be written on a selected disk surface is sent from the host through the user interface 38 to the head select circuitry 58 via a line 60.

Data read from a selected disk surface is amplified in a first stage amplifier 62, "recovered" in a data recovery circuit 63 and then supplied to the user interface 38.

The servo sector data transducer 48 is connected to an amplifier 64 which increases the amplitude of the servo data bursts read from the dedicated surface 20. The recovered data is then passed through an amplifier and filtering circuit 66 and a peak detector circuit 68. The peak detector circuit 68 provides a squared output indicative of relative amplitudes of each successively read, centerline offset A, B and Track Zero bursts. The squared output of the peak detector 68 is provided to one switch pole of an analog switch 70. The analog switch 70 is controlled by digital data sent from the microprocessor 32 via a three bit control line 72. The selected analog output from the analog switch 70 is then converted into a digital word by operation of a very fast analog to digital converter 74, such as type 0820 manufactured by National Semiconductor Corp., Santa Clara, Calif., or equivalent. The converter 74, under the control of the microprocessor 32 via a three bit control line 75 (carrying read/write and chip select information) samples each A and B servo burst over a 2 microsecond period and assigns the sampled peak value a digital number between zero and 255. The 8 bit digital word is then provided to the microprocessor 32 on an 8 bit bus 76. The bus 76 symbolizes the external data bus of the microprocessor 32 with its associated address decode and buffer logic (not shown). The microprocessor 32 then calculates an offset correction value in accordance with the equation:

$$OV \text{ (odd track)} = \frac{32(A - B)}{A + B} + 128$$

and the equation:

$$OV \text{ (even track)} = \frac{32(A + B)}{A + B} + 128$$

where OV equals the offset value, A equals the digital value of the last sampled A burst, and B equals the digital value of the last sampled B burst. The offset value is then used to address a look-up table prestored in the read only memory portion of the microprocessor 32 with digital offset correction values.

As seen in FIG. 2, a beam 82 secures a glass scale 84 to the rotary actuator 86. The glass scale 84 is provided with a series of evenly spaced apart radial microlines 8 of even width. A light source 94 provides collimated light which is directed through the scale 84 to a masked photo transducer array 96. The array 96 develops two sinewave signals in quadrature which are further developed by operation of a pair of differential amplifiers 98 and 100. The amplifier 98 puts out a P1 signal, and the amplifier 100 puts out a P2 signal. The P1 and P2 signals provide track crossing information to the microprocessor 32 and are also used as physical reference points during servo-writing on the servo surface 20 during the manufacturing operation.

A fifth cell and an amplifier 97 provide automatic gain control and driving current to the light source 94. The single light source 94 and the masked array 96 are adjustably mounted to the base casting 11 as a unitary package, as shown in FIG. 2. The optical encoder assembly including the light source 94 and the masked array 96 are described in greater detail in the common assignee's U.S. Pat. No. 4,396,959.

The offset correction values are put out by the microprocessor 32 via a bus 110 to a digital to analog converter 112 where they are converted to analog values. These values are corrected for phase delay in a loop compensation network 114 during track following mode (bypassed by an electronic switch 115 during track seeking mode), and are then amplified by power amplifiers 116 and 118 and applied to the rotary actuator 86. An inverter 120 provides the amplifier 118 with an amplified value which is phase inverted from the value sent to the amplifier 116. These output elements of the servo loop system will be described in greater detail hereinafter.

Base Casting 11

Details of the bottom of the base casting 11 are depicted in the FIG. 3 bottom plan view thereof. The unitary casting 11 includes a peripheral sidewall 122 and a recessed base surface 124. A thickened and reinforced region 126 surrounds a journal location for the rotary actuator assembly 80.

Drive motor supports 130 and 132 are used to mount the motor 13 which is secured to the base 11 by bolts passing through openings 134. The disk spindle assembly is journalled through the base casting 11 at a hub journal 136. A raised portion 138 of the base casting 11 is provided to mount and hold a recirculating air filter 140, shown partially in FIG. 2, for removing particulates from the air within the enclosed housing of the disk drive 10.

The base casting 11 is provided with a series of raised reinforcing ribs. Counting counterclockwise from the journal 136, those ribs include a radial rib 142, a transverse rib 144, a semi-radial rib 146, a radial rib 148, a radial rib 150, and a radial rib 152. A second transverse rib 154 and a detached vertical rib 156 are provided for further strengthening of the base surface 124.

The base casting 11 is considerably thickened in a region 160 provided for the rotary actuator 80. This thickened region 160 is provided with a series of generally parallel, transverse milled recesses 162 defined by raised, generally parallel ribs 164. The recesses 162 are configured as shown in FIG. 3 to provide for a series of reinforcing ribs in both transverse and radial directions relative to the journal location 126 for the rotary actuator assembly 80.

Primarily, the ribs 164 defined by the recesses 162 provide for dissipation of the heat generated in the rotary actuator 80. Secondarily, such rib structure 164 provides for a substantially reinforced base casting 11 in the region of support of the rotary actuator assembly 80. The inventors have discovered that the use of the base casting as described and as depicted in FIG. 3 provides a substantial stiffening and and increases the natural resonant frequency of the base casting 11, a very important consideration in a disk drive, such as the drive 10, having an increased track density to provide greater data storage capacity.

Rotary Actuator Assembly 80

The rotary actuator assembly 80 is depicted mechanically in the exploded view of the components thereof in FIG. 4. This rotor assembly 80 operates in accordance with the same general principles of operation as the rotary actuator depicted and described in the common assignee's co-pending U.S. patent application Ser. No. 190,198, filed Sept. 24, 1980, now U.S. Pat. No. 4,396,959. However, this rotary actuator 80 includes several significant improvements over the earlier version which will now be described.

The base casting 11 is provided on its upper side with a rotary actuator spindle shaft 172 which is glued securely into the journal recess in the base casting generally identified by the reference numeral 126 in FIG. 3. The upper side of the base casting 11 is provided with a recessed region 174 for accomodating the following components: a steel base ring 176, a lower permanent magnet 178, the rotary actuator 86 to which a hub assembly 182 is fixed, an upper permanent magnet 184, an upper steel shield ring 185, and an aluminum top plate 186. The plate 186 is provided with a recess 187 into which the upper steel ring 185 is held by adhesive.

The steel ring 185 acts as a shield to prevent the field from the upper magnet 184 from degaussing the data stored on the bottom surface of the lowest disk 18. The plate 186 is secured to the top wall of the base casting 11 by screws 188 which pass through openings 189 in the top plate 186 and engage aligned threaded bores 191 in the base casting 11.

The hub 182 includes spaced apart ball bearing assemblies and other structure for rotatably engaging the shaft 152. The elements 176, 178, 184, 186 and 188 remain stationary, whereas the rotary actuator 86 and its hub assembly 182 rotate as the center member of the sandwich layered rotor assembly 80.

Figure 5:
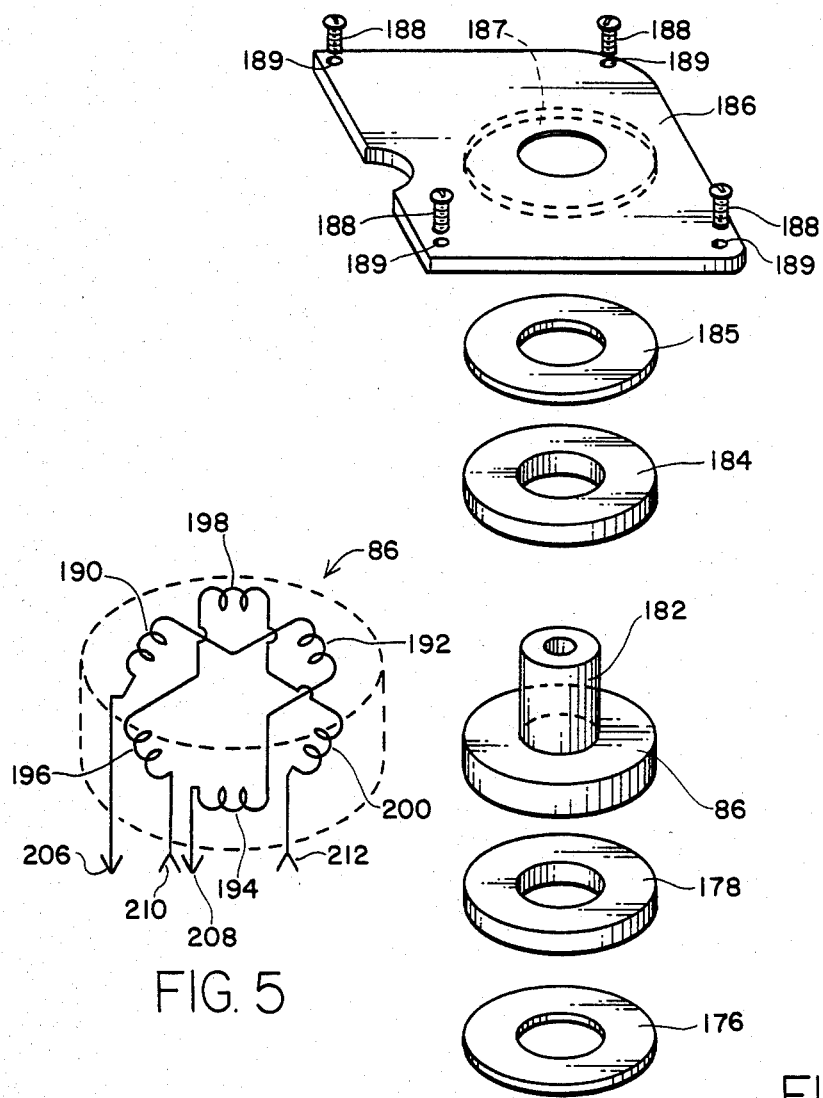
FIG. 5 is an electrical schematic of the connection of the coils comprising the rotor of the transducer arm rotator assembly depicted in FIG. 4.
Figure 5:
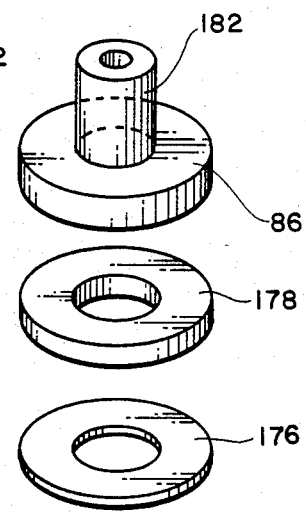

The rotary actuator 86 comprises six windings 190, 192, 194, 196, 198, 200 which are series connected into two interleaved networks 202 and 204 as depicted in FIG. 5. The network 202 is connected via jacks 206 and 208. The network 204 is connected by jacks 210 and 212. Each coil of the six coils 190–200 is formed of e.g. 113 turns of 26 gauge drawn copper wire coated with a suitable insulation varnish and measures appoximately 4.7 ohms resistance. Each coil is wound about a form into the shape resembling a trapezoid. The six coils are aligned in a flat, equally spaced apart arrangement in the actuator 86 with their apexes pointing toward the central axial hub assembly 182, as shown in FIG. 1.

The inventors have found that the use of a continuous top plate 186 provides substantial mechanical rigidity to the rotary actuator assembly 80. In addition, the use of two magnets 178 and 184 has been found to increase the torque generated by the rotator 86. Increased torque decreases access time between substantially separated data tracks.

Servo Loop Output Circuitry

Referring again to FIG. 1, when the microprocessor 32 calculates a digital current value to be applied to the rotary actuator 86, this value is first converted into an analog value by the digital to analog converter 112. The DAC 112 is preferably implemented as a type 1408 made by Motorola, or equivalent. The analog output from the DAC 112 is applied to the lead lag loop compensation network 114 during track follow mode.

During track seek mode, the lead lag loop compensation network is bypassed by an electronic switch 115 operating under the control of the microprocessor 32, and the analog output from the DAC 112 is connected directly to the amplifiers 116 and 118. An analog switch, not shown, under the control of the microprocessor 32 switches the input of the amplifiers 116 and 118 between the loop compensation circuit 114 and the DAC 112. The loop compensation circuit 114 preferably is implemented with operational amplifiers connected to provide the requisite phase lead to prevent positive feedback (oscillation) in the servo loop.

The phase margin of the servo loop of the disk drive 10 is approximately 35 to 40 degrees. (Phase margin equals open loop unity gain phase shift: with a 180 degree phase shift, the loop would feed back positively and be unstable (oscillate)). Phase shift for the loop of the drive 10 is 145 to 150 degrees (180 degrees minus the phase margin).

The loop gain of the closed loop is increased in the drive 10 to cause the transducer assembly 90 to settle in a short time interval. Normally, a 35 to 40 degree phase margin would ring and dampen very slowly. By increasing loop gain and by including an out of phase ring cancelling circuit in the lead lag loop compensation circuit 114, overshoot is effectively cancelled, so that the loop is slew rate limited. Thus, the system 10 ignores the overshoot and slews without it, yielding a rapid settling of the tranducer assembly 90 with minimal phase margin.

ROTOR AMPLIFIERS 116, 118

Figure 6:
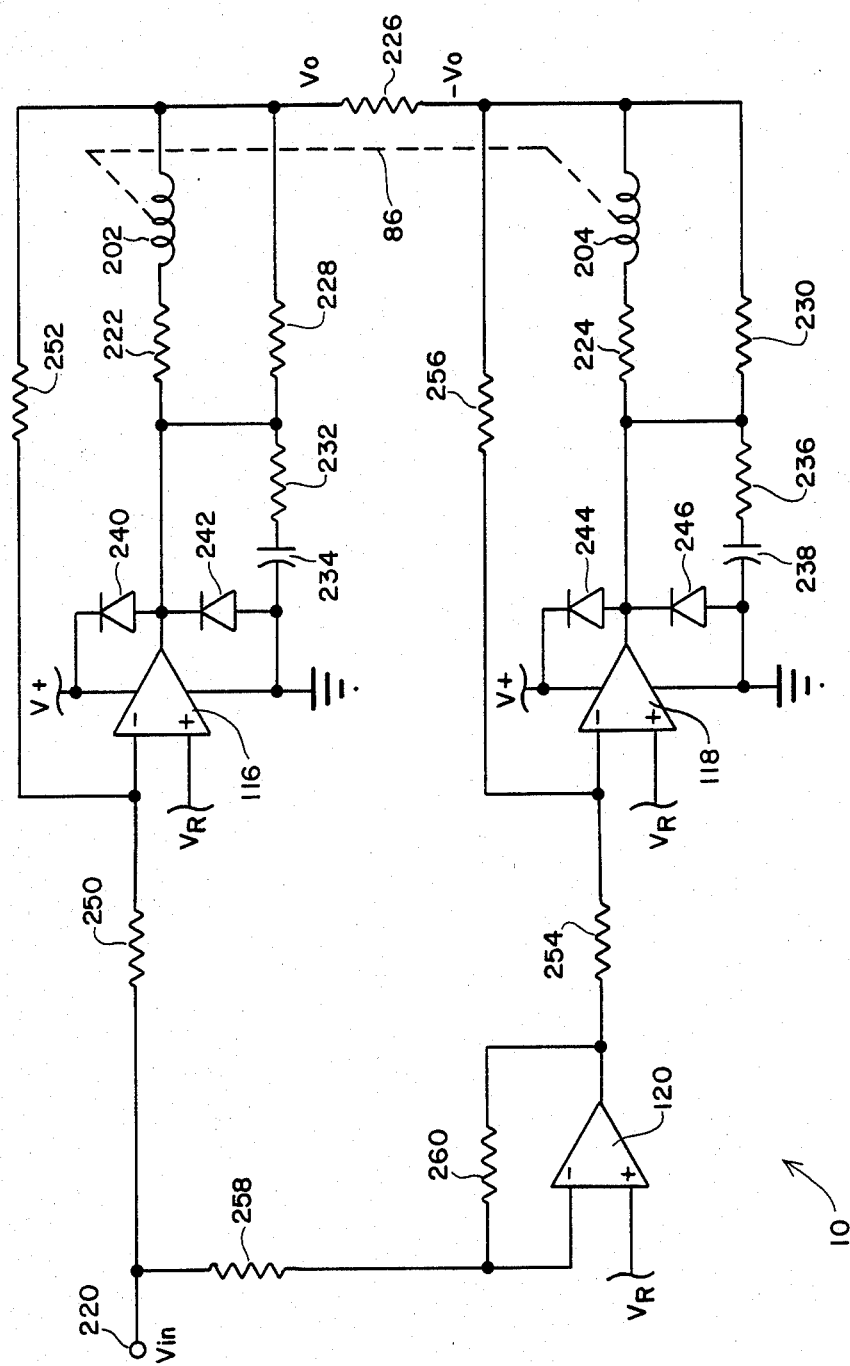
FIG. 6 is a schematic diagram of a further portion of the servo loop of the disk drive depicted in FIGS. 1 and 2.

FIG. 6 depicts the circuit details of the rotary amplifiers 116 and 118. The circuit therein includes an input node 220 for receiving an input control voltage $V_{in}$. The amplifiers 116 and 118 are preferably implemented as two identical monolithic integrated circuit operational power amplifiers, such as the TDA 2030 integrated circuit audio power amplifier array, manufactured by SGS-ATES Semiconductor Corp., Scottsdale, Ariz., or equivalent. The inverting amplifier 120 is preferably a type LM 324 operational amplifier manufactured by National Semiconductor, Santa Clara, Calif., or equivalent.

The amplifiers 116 and 118 are connected to the networks 202 and 204 of the rotor 86. The resistance component of the network 202 is depicted as a series resistor 222, and the resistance component of the network 204 is depicted as a series resistor 224.

A one ohm current-forcing reference resistor 226 is series connected between the networks 202 and 204. Its significance will be discussed shortly hereinafter. Two 68 ohm shunt resistors 228 and 230 are connected in parallel across the networks 202 and 204, respectively. The resistor 228 forms an L-R network with the network 202 having a characteristic impedance of five ohms to approximately 500 Hz whereupon the impedance increases at about 6 db per octave until approximately 5000 Hz where it reaches a terminal value of 68 ohms. The same is true for the L-R network formed by the resistor 230 and network 204. At a load impedance of 68 ohms, each amplifier 116, 118 reaches a terminal gain of approximately 137.

Each amplifier 116, 118 characteristically rolls off at about 10,000 Hz (with a gain of 137). Nevertheless, because of the length of wire leads between each amplifier 116, 118 and the actuator 86, high frequency stabilization of each monolithic amplifier 116, 118 is required. This stabilization is provided by an R-C network comprising a one ohm resistor 232, 236 and a 0.22 microfarad capacitor (234, 238). This network rolls each amplifier 116, 118 off at approximately 720 KHz to provide unity gain stability.

Four diodes 240, 242, 244 and 246 are provided as shown in FIG. 6 for conventional protection of the monolithic amplifiers 116, 118 against voltage transients appearing at the outputs thereof.

A voltage reference circuit, not shown, provides the reference voltage $V_R$. A zener diode connected in series with a resistor between ground and the power supply V+ works well as a suitable reference circuit. In the present example the reference voltage $V_R$ is six volts, and the power supply V+ is 24 volts.

Six equal high value resistors (100 K ohms) 250, 252, 254, 256, 258 and 260 are connected as shown in FIG. 6. Resistors 250 and 252 establish unity gain at an output node $V_o$ and a high input impedance for the amplifier 116. Resistors 254 and 256 establish unity gain at an output node $V_o$ and a high input impedance for the amplifier 118. Resistors 258 and 260 establish unity gain and a high impedance for the inverting amplifier 120.

The amplifiers 116 and 118 are differentially driven. They operate linearly in the range of plus and minus one volt at the input $V_{in}$. At about one volt input the amplifiers begin to saturate, which means that the output current driven through the networks 202 and 204 remains the same as the input voltage goes beyond plus and minus one volt. The linearity of this circuit is determined by the resistances of the two series networks 202 and 204 and the voltage drop across the amplifiers 116 and 118. The maximum current flow reached is approximately two amperes.

According to classic theory concerning operational amplifiers configured as inverting amplifiers, such as the amplifiers 116, 118 the gain is the ratio of the feedback resistor (252, 256) to the input resistor (250, 254). Since the resistors have the same value, gain is unity in the output circuits (from $V_{in}$ to $V_o$) including the amplifiers 116, 118). Each feedback resistor 252, 256 forces the output voltage ($V_o$, or $-V_o$) to be the same as the input voltage $V_{in}$, since the current flowing through the feedback resistor (252, 256) is the same current flowing through the input resistor (250, 254).

Figure 7:
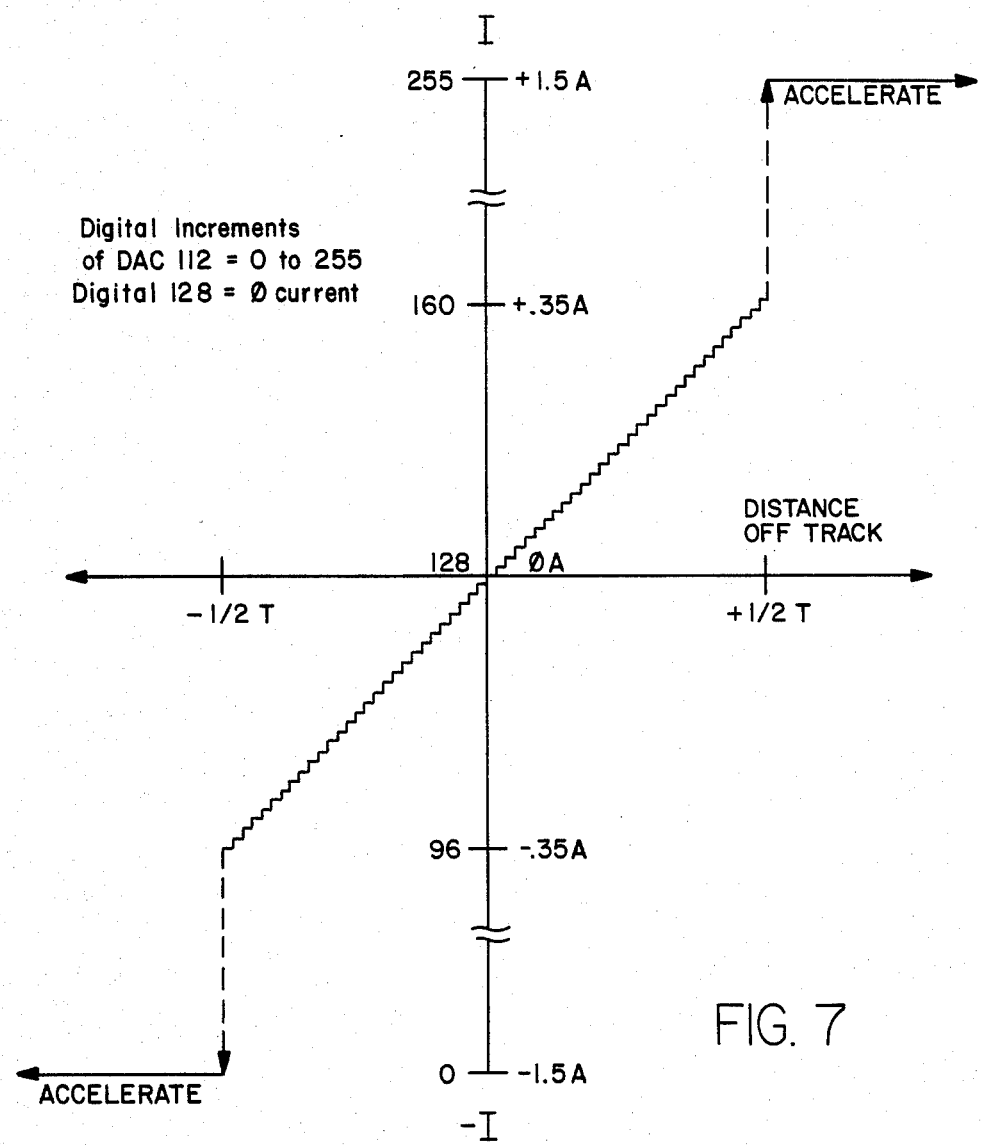
FIG. 7 is a graph of data transducer position plotted against current flowing through the rotor coils of the actuator of the disk drive depicted in FIGS. 1 and 2.

Whatever current is required to maintain the output at the same voltage as the input will flow through the forcing resistor 226, and also the networks 202 and 204. For example, suppose the input voltage $V_{in}$ is plus one half volt. One ampere of current will flow from V+, through the second amplifier 118, through coil 204, through the forcing resistor 226, through coil 202, through the first amplifier 116 to ground. At 0.25 V, the current flowing will be 0.5 amp. At zero input volts, no current flows. FIG. 7 charts the current flow relative to desired translational position change.

Referring again to FIG. 1, and considering FIG. 7, the converter 112 converts the digital values to analog current steps. These current steps are converted to analog voltage steps by a current to voltage converter. If the calculated values are below plus and minus one volt, the output amplifier circuit passes a linearly proportional current through the coil networks 202 and 204.

If the calculated values exceed one volt, then a maximum current passes through the networks. For example, if three amperes of current are commanded to pass through the coils, their resistances (approximately five ohms (cold)) limit the maximum current to approximately two amperes (with a 24 volt supply). The minimum current put out by the amplifiers 116 and 118 must be sufficient to yield an acceleration of the position actuator above a minimum acceleration value followed by the processor 32 by reference to a digital stored acceleration look-up table.

When the input voltage $V_{in}$ equals zero volts, no current passes through the networks 202 and 204, which means that they dissipate no heat unless and until the microprocessor 32 commands the actuator 80 to move by generating a digital value ultimately appearing as a voltage differential $V_{in}$ at the input 220.

TRACK FOLLOWING OPERATIONAL MODE

The microprocessor-based control system of the disk drive 10 has two basic modes of operation: track centerline following mode and track seeking mode.

During track following operations, the microprocessor 32 calculates the amount of correction required to maintain the transducers in alignment with track centerline and puts out a digital correction signal which is converted to one of 256 possible analog correction voltage values by the DAC 112, timed to provide appropriate servo loop phase compensation by the compensation network 114, amplified by the amplifiers 116 and 118 and then applied as a driving signal to the rotor 86. A new correction signal is calculated for each servo burst. The microprocessor 32 is able to put out 216 centerline corrections for each revolution of the disk. Thus, the drive 10 automatically compensates for such centerline offset errors as those due to bearing runout of the disk hub and thermal expansion occurring in real time.

Figure 8:
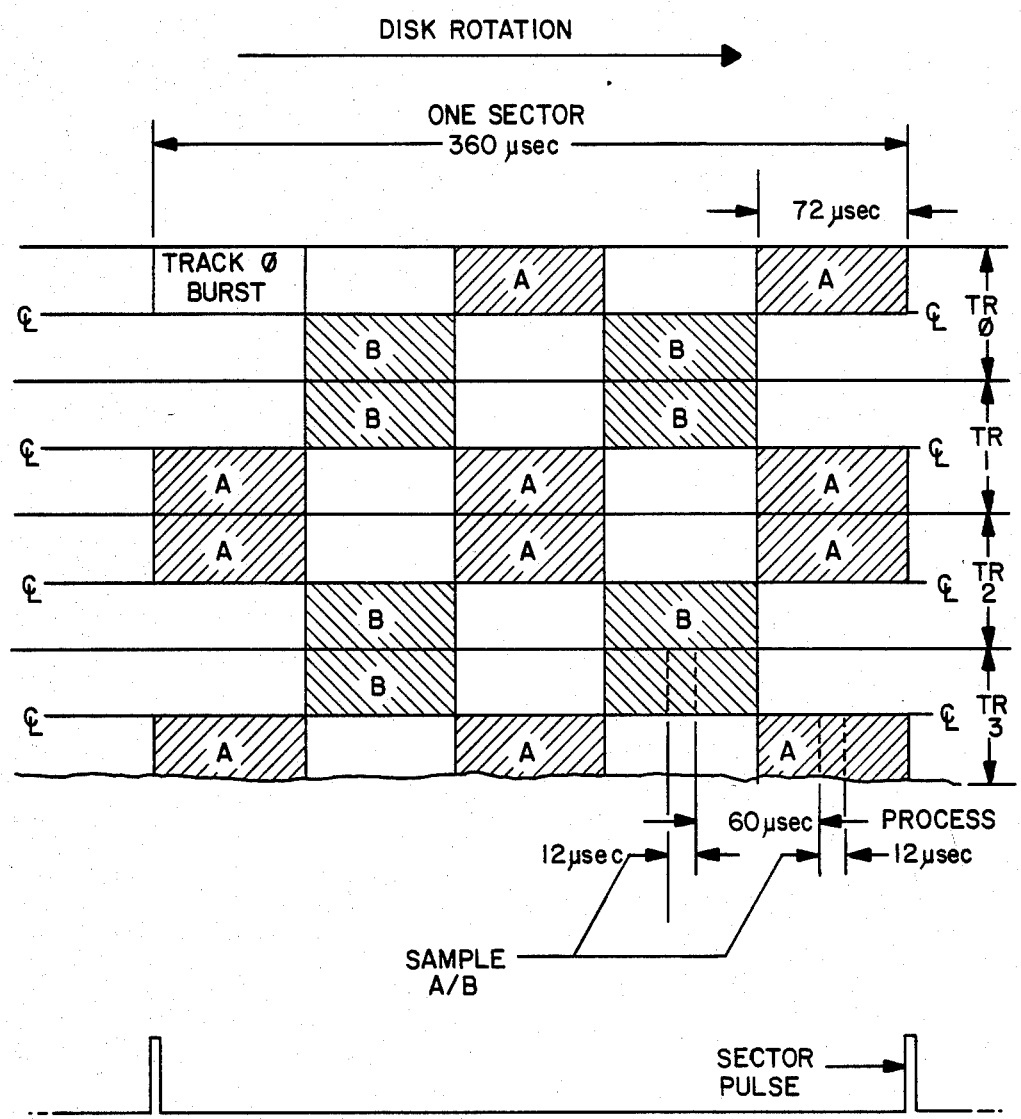
FIG. 8 is a greatly enlarged schematic timing diagram of the outer track portion of one of the prerecorded servo sectors of the disk drive depicted in FIGS. 1 and 2.

The track following mode may be best understood by referring to FIG. 8. There are 54 identical sectors throughout the servo surface 20. FIG. 8 illustrates the internal configuration of one such sector at the region of tracks 0, 1, 2 and 3 (outermost data cylinders). A sector pulse of very short duration is generated by the code disk 22 and the Hall effect sensor 26. The sector pulse resets the microprocessor 32 in the track following mode. Each sector is approximately 360 microseconds in duration.

Each sector includes five bursts: two staggered A bursts interleaved by two centerline offset and staggered B bursts, followed by a Track 0 burst. Each burst occupies 72 microseconds during disk rotation. The Track 0 burst is sampled only at the end of a seeking mode operation to determine whether the outermost track, Track 0, has been reached. The Track 0 burst is actually an A burst which is absent only on the outermost track and which is present on all sectors of all other, inwardly lying tracks. The use of a trailing Track 0 burst simplifies the microcode of the processor 32.

When a sector pulse resets the processor 32, the processor begins to count the sector interval. When the servo transducer 48 has passed about half of the first burst, an A burst, the processor 32 commands the analog to digital converter 74 to sample and convert the peak value of that A burst which is then available at the peak detector 68 by operation of the analog switch 70. The sampling period lasts about 12 microseconds.

The microprocessor 32 stores the three last-taken A/B peak samples. Each new sample replaces the oldest saved sample. Thus, the data library of A/B peak values is constantly rolling over by replacement of the three stored values as new samples are received and stored in the registers of the processor 32.

The microprocessor 32 calculates the difference in magnitude between the last two sampled A/B peak values. The calculated difference between the A peak and the B peak is used to address a look-up table within a prestored read only memory of the processor 32. A correction value is located at the address and is then put out by the processor 32 to correct the rotary actuator 86 as already explained. The correction value moves the actuator 86 and therefore the transducer assembly 90 toward track centerline. The actuator 86 is commanded to move about 20 microseconds before the next sample is taken and the next correction value is determined and put out.

The microprocessor 32 requires about 58 microseconds to make each correction calculation including manipulating of the data required, so there is about a two microsecond margin before the next burst is sampled and the next data correction value is determined. As shown in FIG. 8 there are four samples and calculations made during each sector, and the processor is repeated continuously for each of the 54 sectors during the entire rotation of the disks 12–18.

Since the Track 0 burst is ignored during the track following operational mode, the processor 32 enters a wait state at the end of the fourth determination made in each sector. The wait state ends with the arrival of the next sector pulse, and the sample-determination process repeats for the next sector.

TRACK SEEKING OPERATIONAL MODE

The microprocessor 32 constantly monitors the actual track location of the data transducer assembly 90. During initial power-up, the processor 32 commands the actuator to seek to the outermost track (Track 0). Once Track 0 is reached and confirmed by the absence of the third A burst in a sector, the processor 32 knows that it is at Track 0, and it thereupon initializes an internal track counter. As tracks are crossed during seeks, the track counter is incremented and decremented in accordance with the cycles of the P1 and P2 quadrature signals generated from the synchronous movement of the scale 84 relatively between the light from the fixed light source 94 and the fixed masked photodiode array 96.

Track selection information is provided to the microprocessor 32 from the serial data line 40 via the user interface 38. The line 40 provides serial stepping pulses to the T 0 (pin 14) connection to the microprocessor 32. The processor 32 includes internal serial to parallel registers for receiving 16 bit track select information via the serial line 40. A 16 bit data word is sufficient to specify any one of the available 1172 concentric data tracks (cylinders). The microprocessor 32 calculates the desired track location by adding the number corresponding to the destination track to the current track number.

One advantage flowing from the use of a very fast analog to digital converter 74 (2 microsecond conversion time) is that the microprocessor 32 may actually follow the P1 and P2 quadrature sinewaves directly, without waiting for a maxima or minima as was done heretofore to mark track boundaries. The analog values of P1 and P2 are switched into the A/D 74 by the analog switch 70 under the control of the microprocessor 32.

During seek mode, the microprocessor 32 commands a velocity profile by reference to an internal look-up table stored in its internal read only memory. Actual location of the transducer assembly 90 is monitored by the processor 32 from the P1 and P2 position signals.

During the high velocity mid-position of a seek, the P1 and P2 signals change so rapidly that it is practical to consider only one of those sinewaves. For example, at maximum velocity each sinewave P1 or P2 recurs at about 50 microseconds. The minimum processing loop required to monitor track position requires about 40 microseconds for each execution, even with a microprocessor clock frequency at 12 MHz, and with individual instruction cycles requiring only one microsecond.

During the low velocity end portions of a seek operation, P1 is followed until it reaches a zero axis (midpoint) whereupon the processor 32 switches to follow P2 until it reaches a zero axis. The following of P1 and P2 until the one being followed reaches a zero axis and switchover to the other continues throughout the low velocity portions of the seek operation.

During the seek, the microprocessor 32 knows when the midpoints of the P1 and P2 sinewaves are reached. At each midpoint the processor 32 determines that a track boundary has been reached and it increments or decrements its internal track position counter, depending upon whether the assembly 90 is moving away from or towards Track 0.

At the end of the seek, the processor 32 enters a settle servo loop mode which uses the P1 and P2 quadrature sinewave values generated from the optical encoder assembly (88, 94, 96). The end of the seek is preliminarily determined by reference to the velocity profile look-up table values which indicate the time of expected arrival of the assembly 90 at the destination track for any particular seek distance.

In the settle servo loop mode the processor 32 calculates an angle of position of the assembly 90 by calculating an arc tangent angle from the P1 and P2 sinewaves. The arc tangent angle is determined by reference to a look-up table which contains 64 values of arc tangent between zero and 1 (45 degrees). By sign manipulation and inversions of P1 and P2, this simple table is made to work over the other seven half-quadrants of the circle. Thus, a true circle servo system using the quadrature signals P1 and P2 is thereby realized.

The processor 32 commands the actuator 86 to move to "optical track centerline" of the destination track, based on the angular displacement value resulting from the arc tangent calculation. Of course, the "optical track centerline" may not be the actual track centerline, but the approximation provides for rapid settling of the assembly 90 at the vicinity of centerline of the destination track.

The processor 32 remains in the settle servo loop mode until the assembly 90 settles within a predetermined range of movement relative to the destination track over a predetermined time interval. A counter in the processor 32 is reset each time the range boundary is crossed during settling. After e.g. 20 samples without a reset, the assembly 90 is determined to be adequately settled, and the processor 32 enters the track following mode.

Once the track following mode is initially entered from a seek operation, the processor 32 commands the actuator 86 to move the transducer assembly 90 to actual track centerline as a single step function. Once the assembly 90 has settled on actual destination track centerline, the user interface 38 is signalled via the "seek complete" line 41. The interface 38 then passes this status on to the host equipment via the bus 39, and normal read/write operations are undertaken at the destination track.

For example, in a 40 milliseconds seek (average seek) the seek profile from the look-up table informs the processor 32 that it should expect the assembly 90 to arrive at the destination track after about 30 milliseconds. After 30 milliseconds, the processor 32 enters the settle servo loop mode and servos on the P1 and P2 signals from the optical encoder assembly. This mode takes about five milliseconds. Finally, the processor 32 enters the track following mode using the A/B servo sector bursts at the destination track. This final centerline adjustment requires about two milliseconds before the seek complete signal is put out.

At the end of each seek, the microprocessor 32 takes the middle value of the last three saved A/B burst peak values (which is an A burst) and compares that value with a sample from the Track 0 burst. If the Track 0 sample is less than one half the value of the last A burst peak read, the processor 32 determines that track zero has been reached. This calculation provides a relative peak value determination for track zero which accomodates differences between various drives 10. If a particular drive 10 includes a servo transducer 48 having low output, the relative determination of Track 0 still works well. This approach yields a track zero determination system which is independent of the particular gain characteristics of any particular drive 10 and its related electronics.

It will be appreciated that the servo control system for the drive 10 is a closed loop system during both the track following and track seeking operational modes. By maintaining closed loop during settling, by servoing on the P1 and P2 signals, the drive 10 uses only as much settling time as is actually required for each seek. In some seeks the assembly 90 may actually overshoot the destination track slightly, requiring a little more settling time. In other cases, much less time will be required as the look-up seek profile will closely parallel the locus of actual movement of the assembly 90. In each case only so much time is spent on settling as is required for the particular conditions of the seek.

This approach is to be contrasted with the prior art approach followed with the common assignee's prior Q2000 disk drives, as described in U.S. Pat. No. 4,396,959. In the prior approach, an assumption was made that settling would be complete after a suitably long waiting period, such as 10 milliseconds, whether the assumption was correct or not.

Thus, it will be appreciated that the present drive 10 achieves the general object of providing a very high performance, high data storage capacity rotating disk data storage device at low prime cost.

Here follows a program listing provided in hexadecimal code in Intel format which enables an 8051 Intel microprocessor to function as the processor 32 within a disk drive 10 which is of the eight inch, four disk variety, in accordance with the principles of the present invention:

```
0000: E4 01 85 75 8B 76 75 8D FC C2 8F D2 AB 32 00 00
0010: 02 09 83 75 AB 80 02 03 B1 00 00 74 02 75 08 54
0020: 75 09 00 75 B1 09 32 43 4F 50 59 52 49 47 48 54
0030: 20 31 39 38 32 20 51 55 41 4E 54 55 4D 20 43 4F
0040: 52 50 2E 20 20 50 2F 4E 20 37 31 2D 34 39 30 39
0050: 39 2D 30 31 C2 AF F5 35 78 FB F2 53 A0 10 43 A0
0060: 08 E2 30 94 03 20 E7 14 C2 A4 E3 E2 A2 E7 40 04
0070: F9 E7 80 02 E5 35 F2 30 94 F1 50 EF D5 38 28 75
0080: A0 08 E3 80 FE AA 44 BA 55 02 74 05 F5 35 75 44
0090: 55 78 FB F2 75 38 05 75 36 83 75 37 7D 75 A0 08
00A0: E2 20 E7 03 02 06 94 75 81 07 E4 F5 8C F5 8A F5
00B0: 30 75 2F 01 75 7F 80 75 7E 80 75 21 04 75 90 F6
00C0: D2 62 75 89 15 75 B8 04 75 88 55 75 A8 80 7F 62
00D0: 30 B2 FD 20 B2 FD DF 02 80 05 30 B2 F9 DF 05 74
00E0: 08 F2 80 EA 20 B2 F6 12 06 88 12 06 88 79 FE E5
00F0: 36 24 08 F3 D2 A5 E3 91 75 F5 53 7F 0A 91 75 C3
0100: 95 53 85 54 53 20 E7 F3 60 F1 DF F1 B1 A3 85 3F
0110: 48 B1 A3 C3 E5 48 95 3F 50 F4 24 08 40 F3 B1 A3
0120: 85 3E 46 B1 A3 C3 E5 46 95 3E 50 F4 24 08 40 F3
0130: B1 A3 85 3E 46 B1 A3 C3 E5 3E 95 46 50 F4 24 08
0140: 40 F3 B1 A3 85 3F 47 B1 A3 C3 E5 47 95 3F 50 F4
0150: 24 08 40 F3 B1 A3 85 3E 45 B1 A3 C3 E5 45 95 3E
0160: 50 F4 24 08 40 F3 B1 A3 85 3F 48 B1 A3 C3 E5 3F
0170: 95 48 50 F4 24 08 40 F3 E5 45 25 46 13 F5 49 F4
0180: 24 FE F5 4C 24 05 F5 4B E5 47 25 48 13 F5 4A F4
0190: 24 FE F5 4E 24 05 F5 4D 75 53 00 75 52 00 75 2A
01A0: 80 91 0B 60 04 74 06 01 54 75 20 D4 30 96 32 05
01B0: 21 12 05 FB 85 7F 4F 85 7E 50 05 53 91 0B 70 E5
01C0: 12 05 FB E5 4F C3 95 50 E5 7F 40 0C 95 7E 50 FA
01D0: 24 04 40 E6 05 20 80 09 C3 95 7E 40 DD 24 04 40
01E0: D9 75 22 94 75 23 04 C2 61 12 03 05 75 22 01 75
01F0: 23 00 C2 61 12 08 05 E5 20 45 21 70 EF 75 38 05
0200: D2 A4 D2 A0 E3 C2 A0 E3 D2 AA 51 13 80 FA C2 60
0210: 75 2E 10 E4 F5 42 F5 43 F5 41 30 96 3C C2 AF 70
0220: 90 F3 75 90 FB D2 AF 30 B2 FD 20 B2 FD 75 80 76
0230: 75 8D FC C2 8F D2 AB A3 00 78 FB E2 20 E7 1C F9
0240: E7 F2 90 0E 00 79 7F 89 40 7E 04 75 2B 00 20 96
```

```
0250: 0E C2 AB 91 75 F5 53 F5 52 61 91 00 00 80 E3 20
0260: 00 2A C2 A3 E3 A4 00 D3 78 FD D2 A3 F2 00 00 00
0270: E2 F7 E5 7F 35 7E 13 93 F5 F0 E5 7E C3 95 7F 40
0280: 2A 00 00 A4 C5 F0 A2 F7 35 36 30 2A C2 A3 E3 A4
0290: 00 D3 78 FD D2 A3 F2 00 00 00 E2 F7 E5 7F 35 7E
02A0: 13 93 F5 F0 E5 7F C3 95 7E 50 D6 F4 04 A4 C5 F0
02B0: A2 F7 35 37 F4 04 79 FE F3 F5 2A 25 37 30 60 0E
02C0: 24 18 24 CF E5 2B 33 F5 2B 20 94 13 61 AB 24 06
02D0: 24 F3 40 07 D5 2E 07 80 62 41 5F 75 2E 10 00 63
02E0: 40 01 A9 40 E5 42 25 2A F5 42 E5 43 34 00 F5 43
02F0: 15 41 DE E5 C2 A3 E3 85 3A 3B 85 39 3A 00 C3 78
0300: FD D2 A3 F2 00 00 00 E2 F5 39 E5 41 70 0F F5 42
0310: C2 AF 85 43 36 F5 43 95 36 F5 37 D2 AF 30 60 0D
0320: E5 7F 25 7E 13 24 E0 40 04 74 09 01 54 30 97 09
0330: E5 2B B4 0F 04 74 04 01 54 41 2A C3 E5 39 95 3A
0340: 40 06 E5 39 C5 3A F5 39 E5 39 C3 95 3B 40 06 C5
0350: 39 C5 3B F5 39 C3 E5 3A 95 3B E5 3A 40 02 E5 3B
0360: C3 33 40 04 95 7F 40 0A E5 20 45 21 70 1D 74 03
0370: 01 54 E5 20 45 21 75 20 00 75 21 00 D2 A2 60 0B
0380: 10 62 08 30 94 E8 78 FD 74 03 F2 D2 60 C2 AB E3
0390: 22 75 8D 76 75 8D FE C2 8F D2 AB D2 AB 91 40 30
03A0: 96 06 C2 AB C2 AB 41 13 20 94 F2 75 A8 80 02 06
03B0: 34 75 08 BB 75 09 03 75 81 09 32 D2 A3 E3 A2 95
03C0: 92 61 71 FF E5 23 70 05 E5 22 14 60 05 12 08 05
03D0: 41 02 A2 95 92 61 12 08 05 85 BC 23 85 8A 22 20
03E0: B3 11 91 05 30 B3 0E 91 05 05 22 E5 22 70 E3 05
03F0: 23 80 DF 71 FF E5 22 45 23 70 D7 C2 8B 41 02 85
0400: BC 23 85 8A 22 E4 F5 BC F5 8A 22 7F 00 75 24 0A
0410: 91 40 25 37 24 06 24 F3 40 17 D5 2E F3 20 96 09
0420: E5 20 45 21 70 03 D2 A2 E3 E4 22 DF E0 74 07 01
0430: 54 E5 2A C3 95 29 50 02 F4 04 30 E7 EE 74 FF 22
0440: 91 75 79 FE C3 95 53 30 E7 0D F4 04 25 36 40 14
0450: F3 85 2A 29 F5 2A 22 95 36 50 12 F4 04 F3 85 2A
0460: 29 F5 2A 22 74 FF F3 85 2A 29 F5 2A 22 E4 F3 85
0470: 2A 29 F5 2A 22 75 90 F5 78 FD A4 F2 00 00 00 E2
0480: 75 90 F6 F5 3F A4 F2 00 00 00 E2 F5 3E 95 49 40
0490: 1B F5 55 E5 3F 95 4A 40 07 91 C8 00 00 00 80 08
04A0: F4 04 91 C8 24 80 F4 04 F5 54 00 22 F4 04 F5 55
04B0: E5 3F C3 95 4A 40 08 91 C8 F4 04 F5 54 00 22 F4
04C0: 04 91 C8 24 80 F5 54 22 F5 F0 90 0E 00 C3 95 55
04D0: 60 17 40 1D E5 55 C5 F0 93 A4 C4 54 0F C5 F0 C4
04E0: 45 F0 90 0F 00 93 00 00 22 A4 A4 A4 A4 74 20
04F0: 22 E5 55 93 A4 C4 54 0F C5 F0 C4 45 F0 90 0F 00
0500: 93 24 C0 F4 04 22 E5 28 25 34 F5 28 7E 02 20 61
0510: 4C F2 20 40 23 20 41 0F E2 F2 25 4E 40 3B DF F8
0520: E5 36 F3 DE F3 80 0D E2 F2 25 4D 50 2C DF F8 E5
0530: 36 F3 DE F3 74 01 01 54 20 41 0F E2 F2 25 4B 50
0540: 18 DF F8 E5 36 F3 DE F3 80 EA E2 F2 25 4C 40 09
0550: DF F8 E5 36 F3 DE F3 80 DD 63 90 03 22 F2 20 40
0560: 21 20 41 0F E2 F2 25 4C 40 EF DF F8 E5 36 F3 DE
0570: F3 A1 34 E2 F2 25 4B 50 E0 DF F8 E5 36 F3 DE F3
0580: A1 34 20 41 0F E2 F2 25 4E 40 CE DF F8 E5 36 F3
0590: DE F3 A1 34 E2 F2 25 4D 50 BF DF F8 E5 36 F3 DE
05A0: F3 A1 34 75 90 F5 78 FD A4 F2 00 00 00 E2 75 90
05B0: F6 F5 3F A4 F2 00 00 00 E2 F5 3E 22 12 04 75 30
05C0: 96 02 F5 22 E5 22 54 03 03 03 30 61 02 F4 04 25
05D0: 52 F5 52 75 28 00 E5 4A C3 95 3F 92 41 E5 49 C3
```

```
05E0: 95 3E 30 41 01 B3 92 40 75 90 F6 30 40 03 75 90
05F0: F5 20 61 03 63 90 03 D2 A1 E3 22 30 B2 FD 20 D2
0600: FD C2 AF 75 90 F3 75 90 FB 7F 09 D2 AF DF FE C2
0610: A3 E3 A4 A3 78 FD D2 A3 F2 00 00 00 E2 F5 7F 7F
0620: 19 DF FE 00 C2 A3 E3 A4 A3 00 D2 A3 F2 00 00 00
0630: E2 F5 7E 22 75 81 07 C2 AA E4 F5 3C F5 3D C2 61
0640: E5 20 F5 22 45 21 85 21 23 70 2B D2 61 05 2F E5
0650: 2F 70 02 05 30 E5 2F B4 94 13 E5 30 B4 04 0E 75
0660: 30 00 75 2F 01 05 3C E5 3C 70 02 05 3D 85 30 23
0670: 85 2F 22 12 08 05 30 94 C5 02 02 08 D2 A5 E3 74
0680: 80 C2 AF 79 FE F3 80 F9 E4 FF FE 7D 08 DF FE DE
0690: FC DD FA 22 78 FB E2 30 E7 FA 79 FE 54 7F 60 11
06A0: 14 60 12 14 60 15 14 60 19 14 60 2C 14 60 3C 80
06B0: E3 E2 F2 80 FC D2 A5 E2 F3 80 FC E4 F3 04 70 FC
06C0: 80 D2 D2 A5 E3 75 36 82 75 49 6C 75 4A 6C 78 FB
06D0: E2 F5 53 12 04 40 80 F6 D2 A5 E3 75 20 00 75 36
06E0: 80 75 37 80 D2 60 12 02 13 80 ED 75 90 F3 75 90
06F0: FB D2 A3 E3 12 06 88 79 FD F3 E3 F2 75 90 F3 12
0700: 06 88 F3 E3 F2 75 90 F7 12 06 88 F3 E3 F2 80 84
0710: 00 00 00 00 00 00 00 00 00 00 00 00 00 00 00 00
0720: 00 00 00 00 00 00 00 00 00 00 00 00 00 00 00 00
0730: 00 00 00 00 00 00 00 00 00 00 00 00 00 00 00 00
0740: 00 00 00 00 00 00 00 00 00 00 00 00 00 00 00 00
0750: 00 00 00 00 00 00 00 00 00 00 00 00 00 00 00 00
0760: 00 00 00 00 00 00 00 00 00 00 00 00 00 00 00 00
0770: 00 00 00 00 00 00 00 00 00 00 00 00 00 00 00 00
0780: 00 00 00 00 00 00 00 00 00 00 00 00 00 00 00 00
0790: 00 00 00 00 00 00 00 00 00 00 00 00 00 00 00 00
07A0: 00 00 00 00 00 00 00 00 00 00 00 00 00 00 00 00
07B0: 00 00 00 00 00 00 00 00 00 00 00 00 00 00 00 00
07C0: 00 00 00 00 00 00 00 00 00 00 00 00 00 00 00 00
07D0: 00 00 00 00 00 00 00 00 00 00 00 00 00 00 00 00
07E0: 00 00 00 00 00 00 00 00 00 00 00 00 00 00 00 00
07F0: 00 00 00 00 00 00 00 00 00 00 00 00 00 02 09 83
0800: 02 09 83 41 3A 75 A8 80 E5 20 45 21 70 04 20 61
0810: 01 22 79 FE 78 FD C3 E5 20 20 61 1E 75 34 FF 75
0820: 31 FF 75 32 00 95 22 F5 51 E5 21 95 23 50 1C 85
0830: 21 23 05 20 22 E4 F5 51 80 11 25 22 F5 51 E5 21
0840: 35 23 75 31 00 75 32 FF 75 34 01 F5 21 85 51 20
0850: C2 A2 D2 A6 E5 20 C3 94 4A E5 21 94 02 40 02 C2
0860: A6 C3 E5 22 94 07 E5 23 94 00 40 97 C3 E5 23 70
0870: 47 E5 22 13 F5 24 34 00 F5 26 90 0B 6F 93 F5 33
0880: 12 05 BC E5 31 F3 7F 00 12 05 0C 15 24 C2 64 7F
0890: FC 12 05 06 D5 24 02 21 8C EF 25 33 40 14 E5 24
08A0: 20 64 08 B4 01 07 E5 36 F3 80 E4 00 00 E5 31 F3
08B0: 80 DD D2 64 00 00 80 EE 74 FF 20 1A 08 A2 1B E5
08C0: 22 13 A2 19 13 F5 26 C3 33 F5 51 75 F0 00 92 F0
08D0: E5 22 C3 95 51 F5 24 E5 23 95 F0 F5 25 90 0C 00
08E0: E5 26 93 F5 33 E5 24 60 02 05 25 12 05 BC 90 0C
08F0: 00 E5 31 F3 7F 00 12 05 0C D5 24 02 15 25 7F FD
0900: 12 05 06 D5 24 05 D5 25 02 80 45 CF 24 07 50 EE
0910: E5 24 54 03 70 E8 7F FC 63 90 03 63 28 02 12 05
0920: 0C 63 90 03 63 28 02 12 05 0C E5 33 23 2F 40 11
0930: E5 31 F3 15 24 15 24 15 24 D5 24 DA D5 25 D7 80
0940: 0F E5 36 F3 15 24 15 24 15 24 D5 24 C9 D5 25 C6
0950: 7F FC 63 90 03 63 28 02 12 05 0C 63 90 03 63 28
0960: 02 12 05 0C E5 26 93 23 2F 40 0F E5 36 F3 15 26
0970: 15 26 E5 26 24 E0 40 D8 80 0D E5 32 F3 15 26 15
```

```
0980: 26 E5 26 24 E0 40 C9 E5 26 23 F5 26 90 0B 6F E5
0990: 32 F3 E5 26 93 24 FC FF 12 05 06 EF 30 E7 04 24
09A0: 06 50 03 E5 32 F3 15 26 E5 26 24 FC 40 E4 E5 32
09B0: F3 E5 28 54 03 A2 61 92 E2 24 02 83 80 0B C0 80
09C0: 40 00 80 40 00 C0 F5 53 C2 63 7F 19 DF FE 75 27
09D0: 00 7A 02 C3 E5 52 95 53 30 61 02 F4 04 F5 26 20
09E0: E7 03 75 26 FF 12 04 75 C3 95 53 60 48 20 61 0A
09F0: 30 E7 0C 20 63 52 D2 63 80 3B 20 E7 04 80 F4 F4
0A00: 04 F5 F0 25 26 F5 26 50 6A 60 68 B5 54 53 C2 63
0A10: EA 83 80 0B C0 80 60 40 30 20 10 08 04 02 01 90
0A20: 0D 00 FB 93 25 F0 E5 32 50 0D E5 C3 95 26 40 05
0A30: 0A E5 32 80 02 E5 36 F3 80 AB 12 05 BC E5 22 75
0A40: F0 40 A4 B5 F0 27 F5 26 74 80 F3 C2 A1 E3 C3 E5
0A50: 26 94 40 F5 26 E5 27 94 00 F5 27 40 16 45 26 60
0A60: 12 E5 53 20 61 04 24 40 80 02 24 C0 F5 53 12 04
0A70: 0B 80 DB 74 80 F3 C2 A1 E3 65 52 53 12 04 0B 70
0A80: 07 30 96 03 12 02 0E 22 E5 29 F3 75 26 80 E5 24
0A90: C3 95 52 30 61 02 F4 04 F5 26 75 27 C0 C2 63 85
0AA0: 54 53 12 04 75 C3 95 53 30 61 02 F4 04 20 E7 0E
0AB0: C2 63 25 26 F5 26 E5 27 34 00 F5 27 80 E1 20 63
0AC0: 04 D2 63 80 DD 12 04 0B 70 04 B2 61 41 48 74 06
0AD0: 02 00 54 00 00 00 00 00 00 00 00 00 00 00 00 00
0AE0: 00 00 00 00 00 00 00 00 00 00 00 00 00 00 00 00
0AF0: 00 00 00 00 00 00 00 00 00 00 00 00 00 00 00 00
0B00: 00 00 00 00 00 00 00 00 00 00 00 00 00 00 00 00
0B10: 00 00 00 00 00 00 00 00 00 00 00 00 00 00 00 00
0B20: 00 00 00 00 00 00 00 00 00 00 00 00 00 00 00 00
0B30: 00 00 00 00 00 00 00 00 00 00 00 00 00 00 00 00
0B40: 00 00 00 00 00 00 00 00 00 00 00 00 00 00 00 00
0B50: 00 00 00 00 00 00 00 00 00 00 00 00 00 00 00 00
0B60: 00 00 00 00 00 00 00 00 00 00 00 00 00 00 00 FF
0B70: 79 32 27 21 1D 1A 18 16 15 14 13 12 11 11 10 0F
0B80: 0F 0F 0E 0E 0D 0D 0D 0D 0C 0C 0C 0C 0B 0B 0B 0B
0B90: 0B 0A 0A 0A 0A 0A 0A 0A 0A 09 09 09 09 09 09 09
0BA0: 09 09 09 08 08 08 08 08 08 08 08 08 08 08 08 08
0BB0: 08 08 07 07 07 07 07 07 07 07 07 07 07 07 07 07
0BC0: 07 07 07 07 07 07 07 06 06 06 06 06 06 06 06 06
0BD0: 06 06 06 06 06 06 06 06 06 06 06 06 06 06 06 06
0BE0: 06 06 06 06 06 06 06 06 06 06 05 05 05 05 05 05
0BF0: 00 00 00 00 00 00 32 69 8C A4 B5 C2 CC D3 D9 DE
0C00: FF AC 47 37 2E 29 25 22 1F 1D 1C 1B 19 18 17 17
0C10: 16 15 15 14 13 13 13 12 12 11 11 11 10 10 10 10
0C20: 0F 0F 0F 0F 0E 0E 0E 0E 0E 0D 0D 0D 0D 0D 0D 0D
0C30: 0C 0C 0C 0C 0C 0C 0C 0C 0C 0B 0B 0B 0B 0B 0B 0B
0C40: 0B 0B 0B 0B 0A 0A 0A 0A 0A 0A 0A 0A 0A 0A 0A 0A
0C50: 0A 0A 0A 09 09 09 09 09 09 09 09 09 09 09 09 09
0C60: 09 09 09 09 09 09 09 08 08 08 08 08 08 08 08 08
0C70: 08 08 08 08 08 08 08 08 08 08 08 08 08 08 08 08
0C80: 08 08 08 08 07 07 07 07 07 07 07 07 07 07 07 07
0C90: 07 07 07 07 07 07 07 07 07 07 07 07 07 07 07 07
0CA0: 07 07 07 07 07 07 07 07 07 07 07 07 07 07 07 06
0CB0: 06 06 06 06 06 06 06 06 06 06 06 06 06 06 06 06
0CC0: 06 06 06 06 06 06 06 06 06 06 06 06 06 06 06 06
0CD0: 06 06 06 06 06 06 06 06 06 06 06 06 06 06 06 06
0CE0: 06 06 06 06 06 06 06 06 06 06 06 06 06 06 06 06
0CF0: 06 06 06 06 06 05 05 05 05 05 05 05 05 05 05 05
0D00: 00 01 02 03 03 04 04 04 05 05 05 05 06 06 06 06
0D10: 07 07 07 07 07 07 08 08 08 08 08 08 09 09 09 09
```

```
0D20:  09 09 09 0A 0A 0A 0A 0A 0A 0A 0A 0B 0B 0B 0B 0B
0D30:  0B 0B 0B 0B 0C 0C 0C 0C 0C 0C 0C 0C 0C 0D 0D 0D
0D40:  0D 0D 0D 0D 0D 0D 0D 0D 0E 0E 0E 0E 0E 0E 0E 0E
0D50:  0E 0E 0E 0F 0F 0F 0F 0F 0F 0F 0F 0F 0F 0F 0F 0F
0D60:  10 10 10 10 10 10 10 10 10 10 10 10 10 11 11 11
0D70:  11 11 11 11 11 11 11 11 11 11 12 12 12 12 12 12
0D80:  12 12 12 12 12 12 12 12 12 13 13 13 13 13 13 13
0D90:  13 13 13 13 13 13 13 13 13 14 14 14 14 14 14 14
0DA0:  14 14 14 14 14 14 14 14 14 15 15 15 15 15 15 15
0DB0:  15 15 15 15 15 15 15 15 15 15 16 16 16 16 16 16
0DC0:  16 16 16 16 16 16 16 16 16 16 16 16 16 17 17 17
0DD0:  17 17 17 17 17 17 17 17 17 17 17 17 17 17 17 18
0DE0:  18 18 18 18 18 18 18 18 18 18 18 18 18 18 18 18
0DF0:  18 18 18 19 19 19 19 19 19 19 19 19 19 19 19 19
0E00:  FF FF FF FF FF FF FF FF FF FF FF FF FF FF FF FF
0E10:  FF F1 E4 D8 CD C3 BA B2 AB A4 9E 98 92 8D 89 84
0E20:  80 7C 78 75 72 6F 6C 69 66 64 62 5F 5D 5B 59 57
0E30:  55 54 52 50 4F 4D 4C 4A 49 48 47 45 44 43 42 41
0E40:  40 3F 3E 3D 3C 3B 3B 3A 39 38 37 37 36 35 35 34
0E50:  33 33 32 31 31 30 30 2F 2F 2E 2E 2D 2D 2C 2C 2B
0E60:  2B 2A 2A 29 29 29 28 28 27 27 27 26 26 26 25 25
0E70:  25 24 24 24 23 23 23 22 22 22 22 21 21 21 21 20
0E80:  20 20 20 1F 1F 1F 1F 1E 1E 1E 1E 1D 1D 1D 1D 1D
0E90:  1C 1C 1C 1C 1C 1B 1B 1B 1B 1B 1B 1A 1A 1A 1A 1A
0EA0:  1A 19 19 19 19 19 19 19 18 18 18 18 18 18 18 17
0EB0:  17 17 17 17 17 17 16 16 16 16 16 16 16 16 16 15
0EC0:  15 15 15 15 15 15 15 14 14 14 14 14 14 14 14 14
0ED0:  14 14 14 13 13 13 13 13 13 13 13 13 13 13 13 12 12
0EE0:  12 12 12 12 12 12 12 12 12 12 11 11 11 11 11
0EF0:  11 11 11 11 11 11 11 11 10 10 10 10 10 10 10
0F00:  00 00 00 00 00 00 00 01 01 01 01 01 01 02 02 02
0F10:  02 02 02 03 03 03 03 03 03 03 04 04 04 04 04 04
0F20:  05 05 05 05 05 05 06 06 06 06 06 06 06 07 07 07
0F30:  07 07 07 08 08 08 08 08 08 08 09 09 09 09 09 09
0F40:  09 0A 0A 0A 0A 0A 0A 0B 0B 0B 0B 0B 0B 0B 0C 0C
0F50:  0C 0C 0C 0C 0C 0D 0D 0D 0D 0D 0D 0D 0E 0E 0E 0E
0F60:  0E 0E 0E 0F 0F 0F 0F 0F 0F 0F 10 10 10 10 10
0F70:  10 10 11 11 11 11 11 11 11 11 12 12 12 12 12 12
0F80:  12 13 13 13 13 13 13 13 13 14 14 14 14 14 14 14
0F90:  14 14 15 15 15 15 15 15 15 15 16 16 16 16 16 16
0FA0:  16 16 16 17 17 17 17 17 17 17 17 17 18 18 18 18
0FB0:  18 18 18 18 18 19 19 19 19 19 19 19 19 19 1A 1A
0FC0:  1A 1A 1A 1A 1A 1A 1B 1B 1B 1B 1B 1B 1B 1B
0FD0:  1B 1B 1B 1C 1C 1C 1C 1C 1C 1C 1C 1C 1C 1D 1D 1D
0FE0:  1D 1D 1D 1D 1D 1D 1D 1D 1E 1E 1E 1E 1E 1E 1E
0FF0:  1E 1E 1E 1E 1F 1F 1F 1F 1F 1F 1F 1F 1F 1F 1F 1F
```

Having thus described an embodiment of the invention, it will now be appreciated that the objects of the invention have been fully achieved, and it will be understood by those skilled in the art that many changes in construction and circuitry and widely differing embodiments and applications of the invention will suggest themselves without departing from the spirit and scope of the invention. The disclosures and the description herein are purely illustrative and are not intended to be in any sense limiting.

We claim:

1. In a data storage device including a base, a plurality of rotating rigid magnetic media data storage disks commonly journalled for rotation to said base, a plurality of read/write data transducers held in close proximity to the major surfaces of said disks by air-bearing effect, and a current operated rotary actuator carriage mechanism journalled to said base and having an axis of rotation parallel with the axis of rotation of said disks, for carrying said transducers and positioning them at one of a multiplicity of concentric data tracks during data read/write operations and for moving said transducers from track to track during track seeking operations of said device, the improvement comprising:

optical encoder means mounted between said carriage mechanism and said base, for providing a plurality of phase related signals indicating transducer position relative to said base;

at least one surface of said disks containing a plurality of substantially identical, radially aligned and contiguous servo sectors, each sector prerecorded with a plurality of first bursts offset from track centerline in a first direction for odd numbered tracks and offset from track centerline in a second direction for even numbered tracks, and prerecorded with a plurality of second bursts spatially interleaved between said first bursts and offset from track centerline in said second direction for odd numbered tracks and offset from track centerline in said first direction for even numbered tracks, and wherein said bursts are not necessarily phase coherent;

at least one of said transducers being a servo burst transducer for reading every servo sector during track following of a said data track;

peak detection means connected to said servo burst transducer for detecting and putting out average peak amplitude values for each sector servo burst read by said servo burst transducer;

analog switch means connected to said optical encoder means and to said peak detection means for switching between said plurality of phase related position signals and said peak amplitude values of said servo bursts;

analog to digital converter means connected to said analog switch means for converting each analog signal received therefrom into a digital word;

user interface circuit means for receiving digital disk surface and track selection control data;

tachometer means coupled mechanically to said disks for generating clock signals representing sector boundaries;

programmed digital microprocessor means connected to said tachometer means, said analog to digital converter means, said analog switch means, for receiving digital words from from said analog to digital converter means and said data from said user interface circuit means, for calculating therefrom digital control data words: for commanding said rotary actuator to move from a departure track to a user defined destination track and to settle thereat based on information from said optical encoder means during track seeking, and for commanding said rotary actuator to maintain said data transducers in track centerline alignment based on information from said peak detection means during track following;

digital to analog converter means connected to said microprocessor means for receiving and converting said digital control data words into analog signal values, rotary actuator drive amplifier means connected to said digital to analog converter means for receiving said analog signal values, for amplifying them and putting them out to control said carriage mechanism during track following and during track seeking and settling.

2. The device set forth in claim 1 further comprising an improved rotary actuator in said carriage mechanism, said actuator having a flux return fixed base plate, a flux return top plate, a first generally annular permanent magnet secured to said fixed base plate and characterized by an even number plurality of adjacently opposed field magnetic segments in which the north and south poles alternate at the major surfaces thereof, a second generally annular permanent magnet secured to said flux return top plate and having the same arrangement of opposed field magnetic segments as said first magnet, a generally annular, rotatable coil assembly placed between and closely spaced away from said first and second magnets, said coil assembly containing the same number plurality of coils as there are magnetic segments in said permanent magnets, said coils being aligned adjacent to said aligned magnetic segments at at least one position of rotation of said assembly, said coils being connected into two series of opposed interleaved windings adjacently disposed in said assembly, and said carriage mechanism being secured to said assembly.

3. The device set forth in claim 2 wherein said base includes an enclosed compartment for containing said rotary actuator, and wherein said base includes an external reinforced rib surface adjacent said compartment and adapted to dissipate heat generated by said actuator.

4. The device set forth in claim 1 wherein said base comprises a casting including integral reinforcing rib members extending generally radially outwardly from the journal for said rotating disks and the journal location of said rotary actuator, and wherein said casting further comprises heat dissipation surfaces formed on an outward major surface thereof adjacent said journal location for dissipating heat generated by said actuator.

5. The device set forth in claim 1 wherein said carriage mechanism includes a plurality of radial arms, each having a widened end secured to said actuator assembly and having a narrowed end securing at least one said data transducer, each said arm defining a series of adjacently spaced apart circular openings of decreasing diameter aligned generally longitudinally along said arm with the largest opening adjacent the wide end thereof and the smallest opening adjacent the narrow end thereof.

6. The device set forth in claim 1 wherein said programmed microprocessor means commands track following by calculating one of sixty four adjacent integers in a range between 96 and 160, and wherein track centerline is defined by the number 128, in accordance with the equations:

$$\text{OFFSET VALUE (Odd Track)} = \frac{32(A - B)}{A + B} + 128$$

$$\text{OFFSET VALUE (Even Track)} = \frac{32(A + B)}{A + B} + 128$$

where A is the digital word corresponding to average peak amplitude of a burst of one type and where B is the digital word corresponding to average peak amplitude of a burst of the other type, both as read by said servo transducer.

7. The device set forth in claim 6 wherein said programmed digital microprocessor commands track seeking by putting out the highest available integer to command rotor acceleration in one direction and the lowest available integer to command rotor acceleration in the other direction.

8. The device set forth in claim 2 wherein said rotary actuator driver amplifier means comprises a push-pull amplifier pair arranged as complementary constant voltage differential amplifiers wherein substantially no current flows through the coils of said rotary actuator when said servo transducer is aligned with the centerline of a selected track during track following.

9. An improved data storage device comprising:
a unitary base casting;
a plurality of non-removable rotating rigid magnetic media data storage disks journalled to said base casting for common rotation relative thereto, each disk having a series of concentric data tracks for storing data;

means for rotating said disks;

a plurality of commonly mounted read/write data transducers held in close proximity to the major surfaces of said disks by air-bearing effect;

moveable carriage means mounted to said base casting for commonly moving said data transducers relative to data tracks of said disks;

electromechanical actuator means for moving said carriage means in response to analog electrical control signals;

optical encoder means operative between said carriage means and said base casting for generating a plurality of periodic, phase related signals indicating position of said carriage means relative to said base casting;

at least one of the data surfaces of said disks contaning servo sectors prerecorded with a plurality of first bursts offset from track centerline in a first radial direction for odd numbered tracks and offset from track centerline in a first radial direction for odd numbered tracks and offset from track centerline in an opposite second radial direction for even numbered tracks, and a plurality of second bursts adjacently interleaved between said first bursts, said second bursts being offset from track centerline in said second direction for odd numbered tracks and offset in said first direction for even numbered tracks, each said burst not being phase coherent with any other burst;

one of said data transducers for reading every said servo sector during track following of a said data track location;

sector boundary generator means operative between said disks and said base casting for generating electrical pulses indicative of boundaries of said servo sectors on said surface on which said bursts are prerecorded;

peak detection means connected to said servo transducer for detecting and putting out average peak amplitude values for each burst read by said servo transducer;

analog switch means connected to said optical encoder means and to said peak detector means for switching between said plurality of phase related position signals and said peak amplitude values of said bursts;

analog to digital converter means connected to said analog switch means for converting each analog position signal and peak amplitude value received from said switch means into a digital word;

user interface circuit means including transducer select circuitry connected to said data transducers and to a host system for receiving digital disk surface and data track selection control data and data to be written through a selected one of said transducers to a selected data track;

programmed digital controller means connected to said analog to digital converter means, said analog switch means, said sector boundary generator means and said user interface means, for controlling said analog switch means, for receiving digital words from said analog to digital converter means and said disk surface and data track selection control data from said user interface means, and for calculating therefrom digital control words: for controlling said actuator means to move said carriage from a departure track location to a destination track location and to settle thereat during track seeking operations, and to maintain said transducers in track centerline alignment during track following operations;

digital to analog converter means connected to said digital controller means for receiving said digital data control words and for converting them into proportional analog signal values;

actuator driver amplifier means connected to said digital to analog converter means for amplifying said analog signal values and for powering said actuator to move in accordance with said values.

10. The improved data storage device set forth in claim 9 wherein said periodic, phase related signals put out by said optical encoder means comprise a pair of sinewaves in quadrature and wherein said controller includes means for determining position of said carriage with digital values corresponding to said sinewaves.

11. The improved data storage device set forth in claim 9 further comprising reference track detection means for detecting when said servo transducer is located at a predetermined reference track.

12. The improved data storage device set forth in claim 11 wherein said servo surface contains a different burst arrangement in said reference track than the burst arrangements of all other data tracks and wherein said controller includes means for testing for the presence of said different burst arrangement.

13. The improved data storage device set forth in claim 9 further comprising lead-lag servo loop compensation means connected to said digital to analog converter means for providing phase compensation to said analog signal values during track following operations, and wherein said actuator driver amplfier means is connected to said loop compensation means during track following operations and is connected to said digital to analog converter means during track seeking operations.

14. The improved data storage device set forth in claim 9 wherein said programmed digital controller means commands track following by calculating one of sixty four adjacent integers in a range between 96 and 160, and wherein track centerline is defined by the number 128, in accordance with the equations:

$$\text{OFFSET VALUE (Odd Track)} = \frac{32(A - B)}{A + B} + 128$$

$$\text{OFFSET VALUE (Even Track)} = \frac{32(A + B)}{A + B} + 128$$

where A is the digital word corresponding to average peak amplitude of a burst of one type and where B is the digital word corresponding to average peak amplitude of a burst of the other type, both as read by said servo transducer.

15. The improved data storage device set forth in claim 9 wherein said programmed digital controller means commands track seeking by putting out the highest available integer control word to command acceleration of said actuator means in one direction and the lowest available integer control word to command acceleration of said actuator means in the other direction.

16. The improved data storage device set forth in claim 9 wherein said actuator driver amplifier means comprises a push-pull amplifier pair arranged as complementary constant voltage differential amplifiers wherein substantially no current flows through coils of said actuator means when said servo transducer is aligned with the centerline of a data track location during track following.

17. The improved data storage device set forth in claim 9 wherein said programmed digital controller means includes means for calculating a digital control word for every servo sector read by said servo transducer during track following.

18. An improved data storage method comprising the steps of:
   rotating a plurality of rigid magnetic media data storage disks relative to a base,
   reading data from and writing data to major surfaces of said disks with read/write data transducers held in close proximity to said surfaces by air-bearing effect,
   positioning said data transducers at selected ones of a multiplicity of concentric data tracks on said surfaces with a current operated transducer mover mounted to said base,
   providing a plurality of phase related signals indicating transducer position relative to said base,
   prerecording at least one surface of one of said disks with a plurality of radial servo sectors, each sector prerecorded with a plurality of first bursts offset from track centerline in a first direction for odd numbered tracks and offset from track centerline position in a second direction for even numbered tracks, and prerecorded with a plurality of second bursts spatially interleaved between said first bursts and offset from track centerline in said second direction for odd numbered tracks and offset from track centerline in said first direction for even numbered tracks,
   detecting and putting out average peak amplitude values for each sector servo burst read by a transducer for said servo surface,
   switching in a controlled manner between said plurality of phase related signals and said peak amplitude values of said servo bursts,
   converting each switched analog signal into a digital word,
   receiving digital disk surface and track selection control data from a user interface,
   generating clock signals representing sector boundaries with tachometer means coupled mechanically to said disks,
   processing said converted digital words and said control data from said user interface to calculate digital control words in order to command digitally said current operated transducer mover to move from a departure data track location to a destination track location during track seek operations and in order to command digitally said transducer mover to adjust said transducers to data track centerline alignment during track following data read/write operations, and
   converting said digital commands into analog driving currents for application to said transducer mover.

19. The method set forth in claim 18 comprising the further step of:
   calculating digital track following currents as one sixty four adjacent integers in a range between 96 and 160, and wherein track centerline is defined by the number 128, in accordance with the equations:

$$\text{OFFSET VALUE (Odd Track)} = \frac{32(A - B)}{A + B} + 128$$

$$\text{OFFSET VALUE (Even Track)} = \frac{32(A + B)}{A + B} + 128$$

where A is the digital word corresponding to average peak amplitude of one of said first and second bursts and where B is the digital word corresponding to average peak amplitude of the other of said first and second bursts as read by said servo transducer.

20. The method set forth in claim 19 wherein track seeking includes the steps of:
   putting out the highest available integer to command said transducer mover to accelerate in one direction, and
   putting out the lowest available integer to command said transducer mover to accelerate in the opposite direction.

21. The method set forth in claim 18 further comprising the step of providing reference track identification data for a reference track on said servo sector surface as an additional burst within each said sector, except at said reference track.

22. The method set forth in claim 21 further comprising the steps of:
   moving said transducer to said reference track during an initial operation,
   setting a digital track counter to said reference value while said transducer is located at said reference track,
   incrementing or decrementing said track counter in accordance with an initial count corresponding to departure track and with track location digital values derived from said phase related signals as said transducers are moved away from or toward said reference track during track seek operations.

23. The method set forth in claim 18 comprising the further steps of:
   providing a look-up table with digital velocity profile data,
   commanding a velocity profile during track seek operations by referring to said look-up table and calculating and putting out digital current values depending upon the magnitude of the seek and the actual measured positions of the transducers during the seek operation as given by the plurality of phase related signals.

24. The method set forth in claim 18 comprising the further steps of:
   periodically measuring the amplitude of a first said phase related signal as it alternates in value from a minimum to a maximum,
   switching to measure the other of said phase related signals when the first signal reaches a zero axis (amplitude midpoint) and then periodically measuring the amplitude of said other signal,
   switching back to measure said first signal when the other signal reaches a zero axis, and
   continuing to switch back and forth between said first and said other of said phase signals during track seek operations to monitor actual transducer radial position relative to disk surface.

25. The method set forth in claim 18 comprising the further steps of settling near the vicinity of track centerline at the completion of a track seek operation by:
   providing said phase signals in quadrature, providing a look-up table of digital arc tangent values in a predetermined range including the range between zero and unity, calculating an arc tangent angle from said quadrature phase signals by referring to said look-up table, calculating an angular displacement value from said arc tangent angle and putting said value out as a track centerline correction current value to said transducer mover to move said transducer to the vicinity of track centerline, and then correcting said transducers to actual track centerline alignment with said data from said servo sector bursts.

26. The improved data storage method set forth in claim 18 wherein said processing step comprises the step of calculating and putting out a digital control word for every servo sector during track following.

27. An improved microprocessor-based servo control system for a rotating rigid disk data storage device including a base, at least one non-removable rotating data storage disk journalled to said base having data storage surfaces, means for rotating said disk, a data transducer for every data storage surface, moveable carriage means mounted to said base for moving said transducer relative to concentric data track locations defined on said surfaces, electromechanical actuator means for moving said carriage means in response to electrical analog signal values, position encoder means for signalling relative position of said transducer and said base including boundaries of said data tracks, track following and centering servo information prerecorded on at least one storage surface and readible by a said transducer associated with said servo surface and operating within servo transducer means, and user interface means for receiving digital disk data surface and track location control data from a host computer system, said improved servo control system comprising:

programmed digital microprocessor means connected to said position encoder means, said servo transducer means and to said user interface means, for receiving digitized relative position data from said encoder means during track seeking operations, for receiving digitized track following and centering data from said servo transducer means during track following operations, and for receiving said data surface and track location control data from said user interface means from time to time, for calculating digital control words: for commanding said actuator means to move from a departure track location to a destination track location and to settle thereat based on said relative position data during track seeking, and for commanding said actuator means to maintain said transducer in track centerline alignment based on said track following and centering data during track following operations;

digital to analog converter means connected to said microprocessor means for receiving and converting said digital control words into analog signal values, actuator driver amplifier means connected to said digital to analog converter means for receiving and amplifying said analog signal values and for applying them to operate said actuator means.

28. The improved servo control system set forth in claim 27 wherein said track following and centering servo information prerecorded on at least one storage surface comprises a plurality of substantially identical, radially aligned and contiguous servo sectors, each sector prerecorded with a plurality of first bursts offset from track centerline in a first direction for odd numbered tracks and offset from track centerline in a second direction for even numbered tracks, and prerecorded with a plurality of second bursts spatially interleaved between said first bursts and offset from track centerline in said second direction for odd numbered tracks and offset from track centerline in said first direction for even numbered tracks, and wherein said bursts are not necessarily phase coherent, and further comprising peak detection means within said servo transducer means for detecting and putting out average peak amplitude values for each burst read by said servo transducer.

29. The improved servo control system set forth in claim 28 further comprising servo sector marker generator means mechanically coupled to said disks for generating sector boundary marker signals, said servo sector marker generator means being connected to interrupt said microprocessor at the arrival of each sector, so that said microprocessor may receive following and centering data read from each sector, calculate and put out a digital control word in response to each sector boundary marker signal during track following operations.

* * * * *